United States Patent
Morikawa et al.

(10) Patent No.: US 7,484,827 B2
(45) Date of Patent: Feb. 3, 2009

(54) IMAGE FORMING METHOD AND APPARATUS, AND A RECORDING MEDIUM STORING A PROGRAM FOR PERFORMING AN IMAGE FORMING METHOD

(75) Inventors: Minoru Morikawa, Kanagawa (JP); Shinichi Suzuki, Kanagawa (JP); Masafumi Yamada, Kanagawa (JP); Kazumi Ishima, Kanagawa (JP); Tadaaki Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 418 days.

(21) Appl. No.: 11/244,196

(22) Filed: Oct. 6, 2005

(65) Prior Publication Data

US 2006/0082612 A1    Apr. 20, 2006

(51) Int. Cl.
B41J 29/38    (2006.01)
B41J 2/15     (2006.01)

(52) U.S. Cl. .............................. 347/40; 347/5; 347/41; 347/12

(58) Field of Classification Search ............. 347/40–41, 347/5, 19, 37
See application file for complete search history.

(56) References Cited

U.S. PATENT DOCUMENTS 5,453,777 A    9/1995  Pensavecchia et al.
6,297,888 B1 *  10/2001 Noyes et al. ................ 358/1.9
7,290,855 B2 *  11/2007 Chikuma et al. .............. 347/41

FOREIGN PATENT DOCUMENTS

| | | |
|---|---|---|
| JP | 9-185196 | 7/1997 |
| JP | 3067942 | 5/2000 |
| JP | 2001-341344 | 12/2001 |
| JP | 2002-264291 | 9/2002 |
| JP | 2002-264373 | 9/2002 |
| JP | 2004-147260 | 5/2004 |
| JP | 2004-284131 | 10/2004 |
| JP | 3604961 | 10/2004 |
| JP | 2005-66983 | 3/2005 |

\* cited by examiner

Primary Examiner—Julian D Huffman
Assistant Examiner—Jason S Uhlenhake
(74) Attorney, Agent, or Firm—Oblon, Spivak, McClelland, Maier & Neustadt, P.C.

(57) ABSTRACT

An image forming method is performed by an image forming apparatus having a head mounting a plurality of writing units that form an image on a recording medium. The writing units are aligned in a sub-scanning direction perpendicular to a main-scanning direction. A part of the image is formed on the recording medium by the writing units, the part of the image forming a line extending in the main-scanning direction. The step of forming a part of the image is repeated while shifting the writing units in the sub-scanning direction by a predetermined amount of shift. The amount of shift of the wiring units is varied so that an amount of misalignment in a connecting portion between the parts of the image on the recording medium is reduced.

18 Claims, 35 Drawing Sheets

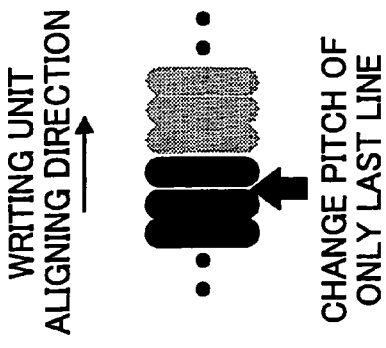
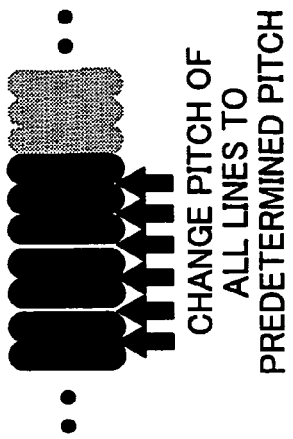
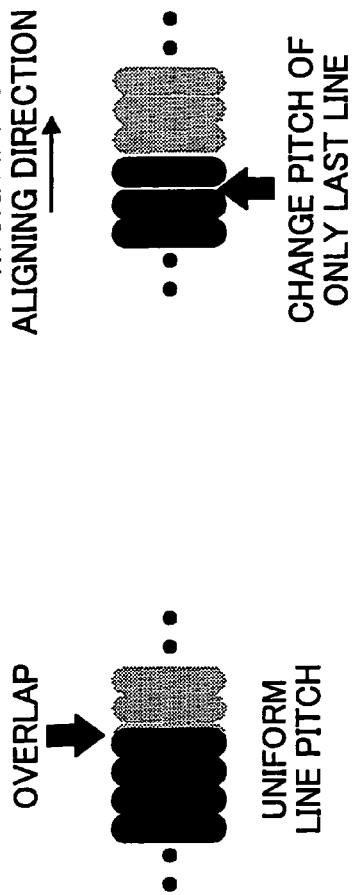
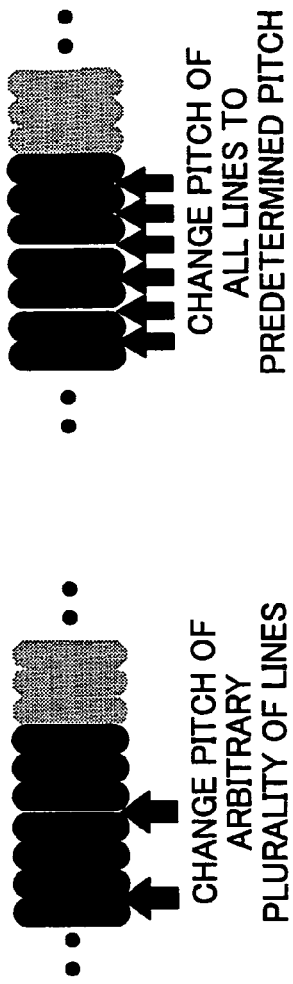
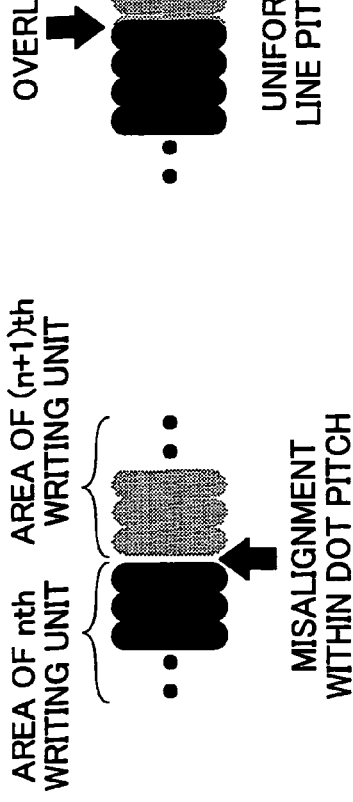
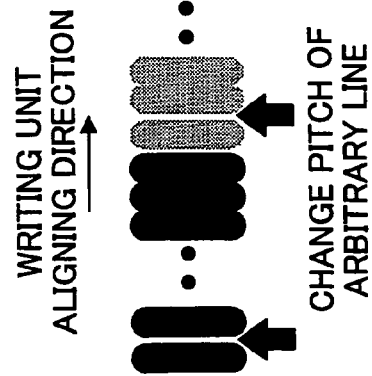

| RECORDING MEDIUM | ① TRANSPARENT HEAT-SENSITIVE FILM<br>(RECORDING LAYER:LEUCO DYE+DEVELPOER,<br>PHOTOTHERMAL CONVERSION LAYER:IR-820B NIHON CHEMICAL.<br>SUBSTRATE:180 μmPET)<br>② THERMAL CTP PLATE(PEAR DRY:PRESTECH)<br>③ PROCESSLESS CTP PLATE<br>(RECORDING LAYER:FLUORINE CONTAINING ACRYLATE+<br>URETHANE RESIN+<br>CARBON BLACK+ μmFILLER,<br>BASE:100 μmPET) |
|---|---|
| LIGHT-SOURCE | ① SEMICONDUCTOR LASER<br>ⅰ) 784nm CW RATED 120mW,SHARP<br>ⅱ) 830nm CW RATED 150mW,SANYO |
| NUMBER OF LIGHT-SOURCES ON HEAD | 12 PIECES |
| LIGHT-SOURCE INTERVAL | 5. 588mm(2400dpi), 5. 6mm(2540dpi) |
| DRUM LINEAR VELOCITY | 330, 660 |
| WRITE DENSITY | 2400dpi, 2540dpi |

FIG.27A

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 10 | 12 | 5 | 10 | 14 | 20 | 24 | 30 | 5 | 10 | 28 | 6 |

FIG.27B

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 6 | 15 | 15 | 10 | 12 | 4 | 10 | 30 | 10 | 5 | 14 | 10 |

FIG.27C

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 12 | 14 | 5 | 12 | 14 | 18 | 26 | 30 | 7 | 10 | 30 | 5 |

FIG.27D

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 5 | 14 | 13 | 10 | 10 | 6 | 12 | 32 | 12 | 5 | 16 | 12 |

FIG.27E

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 11 | 13 | 6 | 10 | 12 | 18 | 24 | 30 | 6 | 10 | 28 | 6 |

FIG.27F

| LIGHT-SOURCE BOUNDARY | 1 | 2 | 3 | 4 | 5 | 6 | 7 | 8 | 9 | 10 | 11 | 12 |
|---|---|---|---|---|---|---|---|---|---|---|---|---|
| LINE INTERVAL (μm) | 5 | 15 | 15 | 10 | 10 | 5 | 10 | 30 | 10 | 5 | 15 | 10 |

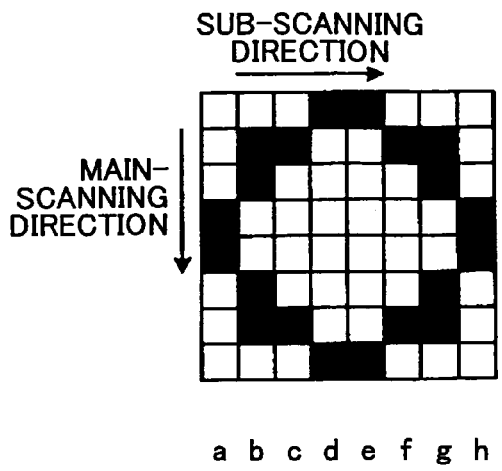
FIG.33A
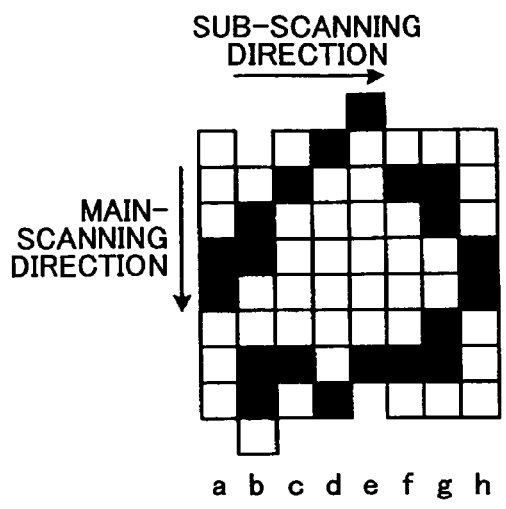
FIG.33B
FIG.33C
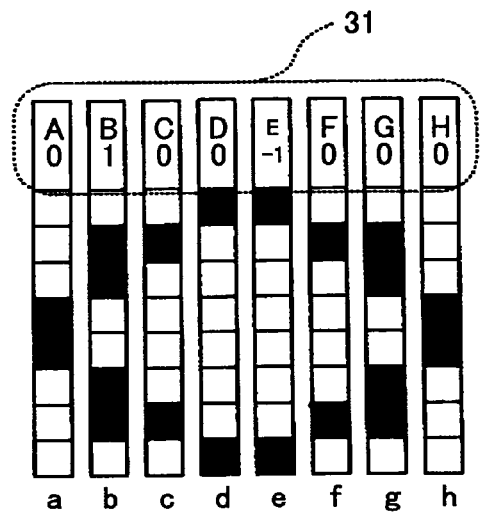
FIG.33D
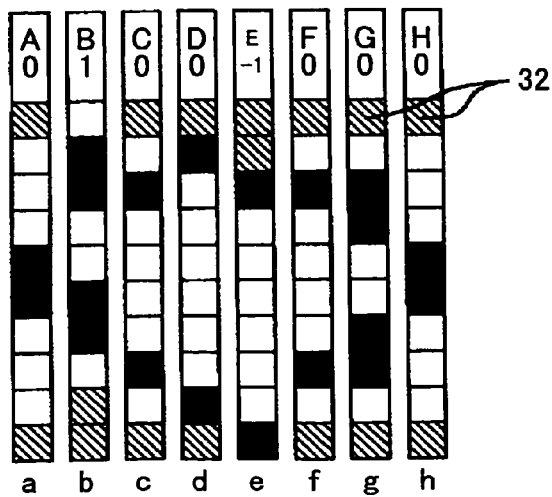

SUB-SCANNING DIRECTION → a b c d a' b' c' d'

SUB-SCANNING DIRECTION → a b c da' b' c' d' a b c d a' b' c' d'

IMAGE FORMING METHOD AND APPARATUS, AND A RECORDING MEDIUM STORING A PROGRAM FOR PERFORMING AN IMAGE FORMING METHOD

BACKGROUND OF THE INVENTION

1. Field of the Invention

The present invention generally relates to image forming methods and apparatuses and, more particularly, to an image forming apparatus, such as an image setter or a plotter for producing a layout paper or a printing plate technique, which can correct a connecting portion error between images formed by adjacent writing units.

2. Description of the Related Art

Conventionally, there is an image forming apparatus, such as disclosed in Japanese Laid-Open Patent Application No. 9-185196 (hereinafter, referred to as Patent Document 1), which comprises a plurality of recording heads for recording images on a recording medium attached to a drum, a beam spot position detector such as a PSD detector and recording head moving means such as a linear motor, so as to perform an irradiation position correction to the drum by adjusting positions of the recording heads in accordance with information regarding the detected beam spot position to correct a connecting portion of the images formed by adjacent recording heads.

Additionally, Japanese Patent Publication No. 3067942 (hereinafter, referred to as Patent Document 2) suggests a method of correcting a positional misalignment at a connecting portion of images formed by adjacent image forming apparatuses. In this method, one or more image forming apparatuses delays formation of images of a first column in a head moving direction until a reference line drawing image forming apparatus completes scanning corresponding to a number of columns, which is a rounded number of positional misalignment columns with respect to one or more image forming apparatuses having a positional misalignment in a head moving direction greater than a width of a column in a moving direction of a recording medium by using, as a reference line, one of a plurality of image forming apparatuses. Further, all the image forming apparatuses completed the initial column scanning, the arrangement of the image forming apparatuses is moved by a distance smaller than a width of the columns so that the image forming apparatuses repeatedly form the same image as a preceding column to overlap with the preceding column, and continues it until the rest of the columns are completely scanned.

According to the apparatus of the Patent Document 1, costs of mechanical parts and a control system of the apparatus are increased since independently controllable moving means must be provided to a plurality of recording heads. Additionally, the cost is further increased if a number of the heads is large.

Additionally, according to the method of the Patent Document 2, an image quality cannot be improved because a line of dark color is emphasized, which is easily visible, or a column having a width close to a width of two columns is formed, which is more easily visible than the boundary since the columns of images formed two timed by using the same data are overlapped in a case where there is dispersion in an amount of misalignment in adjacent image forming apparatuses since the same distance smaller than a width of column is shifted uniformly irrespective of the amount of misalignment of the adjacent image forming apparatuses and image formation is performed using the same image data as a preceding column after all of the image forming apparatuses formed an image of a first column.

In the meantime, an image forming apparatus has an energy irradiation device that irradiates energy. The energy irradiated by the energy irradiation device is converged onto a printing plate material on which an image is formed. The printing plate material is caused to be changed due to this energy. Positions of the printing plate material and the energy irradiation device can be relatively moved. For example, the printing plate material is applied onto an inner surface or an outer surface of a rotatable drum, and the energy irradiation device is arranged on a table that is movable in a direction parallel to the rotational axis of the drum. Accordingly, the printing plate material is movable in a vertical direction due to a movement of the drum, and in a horizontal direction due to a movement of the table. A flux of energy of the energy irradiation device can be located at an arbitrary position on the printing plate material by a rotation of the drum and a movement of the table. Thus, an image original data is recorded as changes in a surface of the printing plate material by the energy irradiation device scanning the surface of the printing plate material while causing drawing point arrangement of the image original data to be formed and position of the printing plate material to correspond to each other and relating concentration information of the drawing point of the image original data to the output energy of the energy irradiation device.

The speed at which an image is recorded on the printing plate material is determined by items such as a rotational speed of the drum, a sensitivity of the printing plate material to energy, an energy that can be irradiated by the energy irradiation device, a recording density of the image, etc. Since the printing plate material on which an image is to be formed is normally an object, other items may be adjusted according to the sensitivity of the printing plate material. The sensitivity of the printing plate material is represented by a degree of change in the printing plate material and the energy density given at that time. The rotational speed of the drum and the irradiation energy of the energy irradiation device are determined as an energy density to the printing plate material. If the rotational speed of the drum is increased while the irradiation energy is constant, the energy density to the printing plate material is decreased correspondingly. On the other hand, if the irradiation energy is increased while the rotational speed of the drum is constant, the energy density to the printing plate material is increased.

Moreover, it is necessary to increase the rotational speed of the drum by increasing the irradiation energy when it is desired to increase a recording speed of an image. In order to increase the irradiation energy, there are a method of increasing a maximum output of an energy source and a method of providing a plurality of energy sources. As an example of the later, there is a method, as disclosed in the above-mentioned Patent Document 2, a method of placing a plurality of energy irradiation devices on the table. According to this method, energy fluxes of the energy irradiation devices are irradiated onto the printing plate material. The energy irradiation devices record an image in a form of sharing the printing plate material in the axial direction of the drum. The energy fluxes of the plurality of energy irradiation devices are arranged linearly.

However, it is difficult to arrange the energy irradiation apparatuses completely linear form. That is, the energy fluxes cannot be arranged in a linear form accurately due to an error when fixing the energy irradiation devices on the table, an error in positions at which the energy fluxes are converged, an error in positions where energy is generated, etc.

Due to the above-mentioned errors, an image recorded on the printing plate material cannot be one in which the image original data is reflected. This is because there is a misalignment generated between the positions of the image original data shared by the energy irradiation devices and positions actually recorded on the printing plate material. This misalignment is recognized in a from of an overlap of images between the energy irradiation devices, a gap generated at a boundary between the energy irradiation devices, or two horizontal lines formed by a single horizontal line having a step at a boundary between the energy irradiation devices.

In order to avoid such a misalignment in images, an adjustment is made so that lines indicating the same horizontal position are recorded on a single line also on the printing plate material by advancing or delaying a time of start of drawing by each of the energy irradiation devices using one of the energy irradiation devices as a reference. Additionally, when images are recorded in an overlapping manner, there is a method in which a start of image formation of one of the overlapping energy irradiation devices is skipped by a time corresponding to the overlap.

However, a positional accuracy of image overlapping between printing plates is an important quality control item for multi-color printing to obtain a desired function by overlapping a plurality of sheets of printing plate images or a wiring pattern of an electronic circuit board. The printing plate material has an expandability of a certain level, and an environmental condition such as temperature or humidity and image writing energy may be a cause of deformation. In such as case, an accuracy of overlapping printing plates can be improved by matching a previously formed printing plate so as to form an image. Additionally, when forming a single image by energy irradiation devices, each of the energy irradiation devices performs image formation simultaneously. Accordingly, a misalignment may be generated due to an error in positions of mounting the energy irradiation devices. If an attempt is made to cause a misalignment at a boundary to be less visible according to an amount of feed in a sub-scanning direction, a misalignment at other boundaries may become large since all of the energy irradiation devices moves simultaneously.

In the meantime, as a conventional image recording apparatus, there are a direct recording type, which performs image recording directly on a recording medium such as a recording paper and an indirect recording type, which performs image recording on an intermediate recording medium and transferring the image to a final recording medium. There is a laser printer or the like using an electrophotography process among image recording apparatuses of the indirect recording type which is widely used presently. In the laser printer using an electrophotography process, a latent image is formed by exposing a photosensitive material which has been charged according to recording image information and, thereafter, visualizing it by a developer and transferring the developed image onto a recording medium such as a recording paper so as to record the image. In this method, the image to be recorded is formed as a form of a latent image on the photosensitive material which is an intermediate recording material. As means for forming image information on the photosensitive material which is an intermediate recording material, a laser exposure device, which scans a laser light by a rotating polygon mirror, is mainly used. Additionally, as other means for forming image information on the photosensitive material, there are known an LED array exposure device, in which many LEDs are arrange in an array form, and a liquid crystal shutter array exposure device, which performs an exposure control by arranging liquid crystal shutters in an array form.

On the other hand, as the method of directly recording an image on a recording medium such as a recording paper, there are methods put into practice such as an inkjet recording method, which perform jet recording by injecting ink directly onto a recording paper according to image information, a thermal recording method, which records an image by directly contacting a heat generating array to a heat-sensitive recording medium, a thermal transfer recording method, which causes a thermal transfer ink sheet to contact a recording medium and transfers ink onto the recording medium by a heat-generating material.

In order to obtain a recorded image of a large size according to the image forming method using the above-mentioned laser exposure device, a width of the laser must be enlarged. Thus, a large distance must be provided between the polygon mirror and the photosensitive material which is an intermediate recording material, and, thereby, the size of the laser exposure device is increased. Additionally, if a scan width is large, a canning speed is increased, which causes a clock of the image to be recorded to be fast. For these reasons, the laser exposure device is rarely used for an image recording apparatus for a large size such as exceeding A3-A2.

On the other hand, according to the image forming method using an array head such as an LED array device or a liquid crystal array, an array head having a length corresponding to a recording width must be used so as to obtain a recorded image of a large size. However, since a high-resolution of more than 300-600 dpi is required for an array head of an image printing apparatus, it is not easy to elongate an array head manufactured using a semiconductor process. Additionally, since the electrophotography process is a page recording method, an array head corresponding to a recording width is required.

On the other hand, according to the recording method to cause a recording head itself to move and scan in a main-scanning direction such as an inkjet recording method, a thermal recording method and thermal transfer method, an image recording apparatus, which can attain image recording of a large size, can be relatively easily constructed. However, according to the recording method causing a recording head to scan, a moving mechanism of the head is complicated, and there is a problem in that a recording time is increased as a size of an image to be recorded is increased. In order to solve such as problem, it is effective also for the method to cause a recording head to scan to use an array head of a long scale corresponding to a recording width. However, it is difficult to fabricate a long scale array head. Further, in order to obtain a long scale recording head for a recording head of an LED array exposure device or the like, it is needed to fabricate array recording heads each having a certain length by using a semiconductor process and connecting the recording heads to each other with high accuracy. In such a case, a recording image width of A3 size requires 300 mm or more and a recording image width of A4 size requires 420 mm or more. Thus, it is difficult to fabricate a recording head of a long scale by a semiconductor process alone.

In the meantime, generally, in an image recording apparatus, it is required to have a recording density of 300-600 dpi or more, that is, a recording head element density of 80-40 μm or less. However, it is difficult to fabricate a head having such a high recording density by connecting recording head elements, and it will become extremely expensive recording head. Additionally, a pitch fluctuation may occur easily at connecting position between the recording head elements.

Thus, there is a problem in that the connecting position tends to be easily observed as an image fluctuation in the recorded image.

Moreover, the above-mentioned Patent Document 1 suggests a method of correcting an error between head elements in a recording apparatus which is capable of recording an image of a large size by driving simultaneously a plurality of aligned recording heads, which irradiate beam spot lights onto a recording medium attached to a cylindrical drum, so as to detect an irradiated position of each of the spot lights.

In order to correct the error between the head elements like the method of the above-mentioned Patent Document 1, a correcting mechanism for mechanically adjusting positions of the head elements. However, it is difficult to achieve such a correcting mechanism satisfying the requirements of high accuracy. If the positions of the head elements are not adjusted accurately, there may be generated a step, a gap or an overlap in a formed image.

SUMMARY OF THE INVENTION

It is a general object of the present invention to provide an improved and useful image forming method and apparatus in which the above-mentioned problems are eliminated.

A more specific object of the present invention is to provide an image forming method and apparatus which can perform a high quality image formation so that a connecting portion of images is not easily visible.

Another object of the present invention is to provide an image recording method and apparatus which can minutely control an amount of shift in a sub-scanning direction.

A further object of the present invention is to provide an image forming method which can minimize an inaccuracy in image formation by performing an adjustment by not a mechanical control but a digital control, and a computer readable recording medium storing a program to perform such an image forming method.

In order to achieve the above-mentioned objects, there is provided according to one aspect of the present invention an image forming method performed by an image forming apparatus having a head mounting a plurality of writing units that form an image on a recording medium, the writing units being aligned in a sub-scanning direction perpendicular to a main-scanning direction, the image forming method comprising: forming a part of the image on the recording medium by the writing units, the part of the image forming a line extending in the main-scanning direction; repeating the step of forming a part of the image while shifting the writing units in the sub-scanning direction by a predetermined amount of shift; and varying the amount of shift of the wiring units so that an amount of misalignment in a connecting portion between the parts of the image on the recording medium is reduced.

According to the above-mentioned invention, a correction of the connecting part in the images can be corrected irrespective of a fluctuation in misalignment in the connecting portion, which may be caused by errors in a mechanical system, an optical system or an assembly process. Thus, image formation of a high quality image having less visible connecting portion can be performed.

There is provided according to another aspect of the present invention a computer readable recording medium storing a program for causing a computer to perform the above mentioned image forming method.

Additionally, there is provided according to another aspect of the present invention an image forming apparatus having a head mounting a plurality of writing units that form an image on a recording medium, the writing units being aligned in a sub-scanning direction perpendicular to a main-scanning direction, the image forming apparatus comprising: image forming means for forming a part of the image on the recording medium by the writing units, the part of the image forming a line extending in the main-scanning direction, the formation of a part of the image being repeated while shifting the writing units in the sub-scanning direction by a predetermined amount of shift; and correcting means for varying the amount of shift of the wiring units so that an amount of misalignment in a connecting portion between the parts of the image on the recording medium is reduced.

According to the above-mentioned invention, a correction of the connecting part in the images can be corrected irrespective of a fluctuation in misalignment in the connecting portion, which may be caused by errors in a mechanical system, an optical system or an assembly process. Thus, image formation of a high quality image having less visible connecting portion can be performed.

Additionally, there is provided according to the present invention an image forming apparatus comprising: a plurality of writing units that form a single image on a recording medium by writing a divided parts of the image on the recording medium in accordance with divided image data obtained by dividing the single image into a plurality of areas; an image data producing unit that produces and stores the divided image data, and sends the divided image data to the writing units; and a line shift amount varying unit that varies an amount of shift of lines in the divided image data on an individual line basis.

According to the above-mentioned invention, fin adjustment of a position of a formed image can be performed, thereby providing an image forming apparatus capable of forming a printing plate at high speed.

Additionally, there is provided according to another aspect of the present invention an image processing apparatus comprising: an output data producing unit that convert raster image data to be supplied to an image recording apparatus into data of an output data format suitable for the image recording apparatus; and a scan position information input unit that provides scan position information to the data of an output data format, the scan position information indicating a scan position written by the image recording apparatus.

According to the above-mentioned invention, a characteristic of the image recording apparatus from which the image data is output can be known from the image data, thereby enabling output of an image which is suitable for the image recording apparatus and has little irregularity.

There is provided according to another aspect of the present invention an image recording apparatus comprising: at least one recording unit that records an image on a recording medium by scanning by a scan unit based on raster image data, which is converted into data of an output data format and supplied from an image processing apparatus; and a scan position determination unit that determines a scan position of the image recording unit in accordance with scan position information provided to the data of an output data format, the scan position information indicating a scan position of an image to be recorded.

According to the above-mentioned invention, an image recording apparatus, which can output an image having little irregularity, can be provided.

Additionally, there is provided according to another aspect of the present invention an image processing method comprising: converting raster image data to be supplied to an image recording apparatus into data of an output data format that is suitable for the image recording apparatus; and providing scan position information to the data of an output data format, the scan position information indicating a scan position written by the image recording apparatus.

According to the above-mentioned invention, a characteristic of the image recording apparatus from which the image data is output can be known from the image data, thereby minimizing inaccuracy and artifact of the formed image.

There is provided according to another aspect of the present invention a computer readable recording medium storing a program for causing a computer to perform the above-mentioned image processing method.

Other objects, features and advantages of the present invention will become more apparent from the following detailed description when read in conjunction with the accompanying drawings.

BRIEF DESCRIPTION OF THE DRAWINGS

FIGS. 2A through 2F are illustrations showing examples of misalignment generated in a connecting portion of light-sources and methods for eliminating the misalignment;

FIG. 16 is an illustration of another method of correcting an amount of misalignment according to the present invention;

FIG. 26 is an illustration showing various conditions of image formation according to the present invention;

FIGS. 27A through 27F are illustrations showing results of measurement of an amount of misalignment in a connecting portion;

FIGS. 33A through 33D are illustrations for explaining another example of the scan position information;

DETAILED DESCRIPTION OF THE PREFERRED EMBODIMENTS

Figure 1:
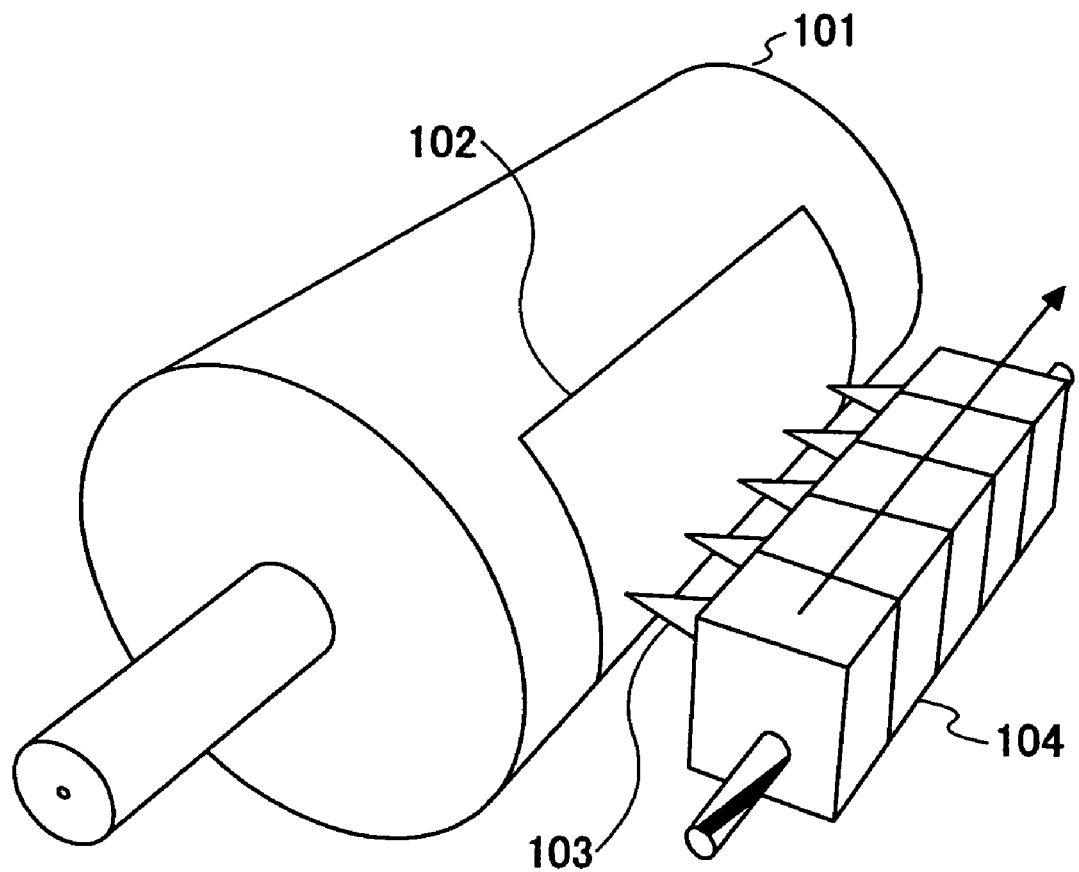
FIG. 1 is an illustration showing an example of a structure of an apparatus to which the present invention is applied.

A description will now be given, with reference to FIGS. 1 through 27, of a first embodiment of the present invention. The present invention relates to a method of performing image formation onto a recording medium by a plurality of writing units (writing means), and, especially to an image forming method of correcting a connecting portion error between adjacent writing units and an image forming apparatus using such an image forming method.

The connecting portion error means a misalignment in a connecting portion of images formed on a recording medium by each writing units, and is considered to include various errors such as an installation error of the writing units and an adjustment error of an optical system, a mechanical error such as a degree of stretch of a recording medium, a contraction or expansion of a plastic of an adhesive and a recording medium and a metal housing, a conveyance error of the writing units, and the like. Any of the above-mentioned errors may be gathered and appear finally as a misalignment of a connecting portion of images formed on the recording medium.

The writing units may be a laser light source such as a semiconductor laser or a gas laser, an LED light source, an inkjet mechanism, a thermal head, etc., and may be a contact type or non-contact type.

The recording medium may be any material, if an image formation can be performed, such as a photo-sensitive CTP plate made of silver salt or photo-polymer, a thermal CTP plate of an abrasion type or others, a PS plate, a mask film of silver salt or a heat-sensitive type, an electrophotographic photo-sensitive material, a paper, a plastic film, a metal film, a glass, a plastic, etc.

As for the scanning method to a recording medium, there are considered a various methods such as a method of rotating a drum to which a recording medium is attached and moving a writing unit in a direction different from a rotating direction of the drum for each rotation of the drum (hereinafter, referred to a drum rotation scanning method), a method of rotating a drum by a predetermined distance after performing write scanning in a direction different from a rotating direction of the drum (hereinafter, referred to as a drum plane scanning method), a method of conveying a recording medium after performing write scanning in a direction different from a conveying direction of the recording medium (hereinafter, referred to as a medium conveyance plane scanning method), etc. Here, the drum plate scanning method and the medium conveyance plane scanning method are collectively referred to as a plane scanning method.

In the drum rotation scanning method, a direction opposite to the rotating direction of the drum corresponds to a main-scanning direction and a direction of movement or shift of a writing unit, which is a direction perpendicular to the main-scanning direction, corresponds to a sub-scanning direction. On the other hand, in the plane scanning method, a direction opposite to the rotating direction of the drum corresponds to a sub-scanning direction and a direction perpendicular to the sub-scanning direction corresponds to a main-scanning direction. In many cases, the main-scanning direction is a direction along which a beam is scanned.

It should be noted that the meaning of the line used in the present invention designates a line image of a width of a single dot formed in the main-scanning direction in the drum rotation scanning method, and a line image of a width of a single dot formed in the sub-scanning direction in the plane scanning method.

Moreover, the direction of alignment of the writing units means the sub-scanning direction in the drum rotation scanning method, and the main-scanning direction in the plane scanning method.

FIG. 1 shows an example of a structure of an apparatus to which the present invention is applied. In FIG. 1, an image is formed by irradiating beams 103 from a plurality of light sources onto a recording medium 102 attached to a drum 101. The light sources move in a direction substantially perpendicular to a rotating direction of the drum 101 for each complete rotation of the drum 101 so as to scan an entire image area.

When an image is formed by a plurality of writing units 104, a two or more write-in means 104, a misalignment may be generated at a connecting portion of images formed by adjacent writing units as shown in FIG. 2A.

To solve such a problem, if image formation is performed with an image resolution, which is a dot pitch obtained from, for example, a value of 2400 dpi as shown in FIG. 2B, to be made constant, an connecting portion of images formed by adjacent writing units has an overlap and a half of each of two lines disappears, which results in a different image. Thus, the images are connected unnaturally. Additionally, since a concentration of the overlapped portions is increased, the connecting portion becomes highly visible.

Figure 5:
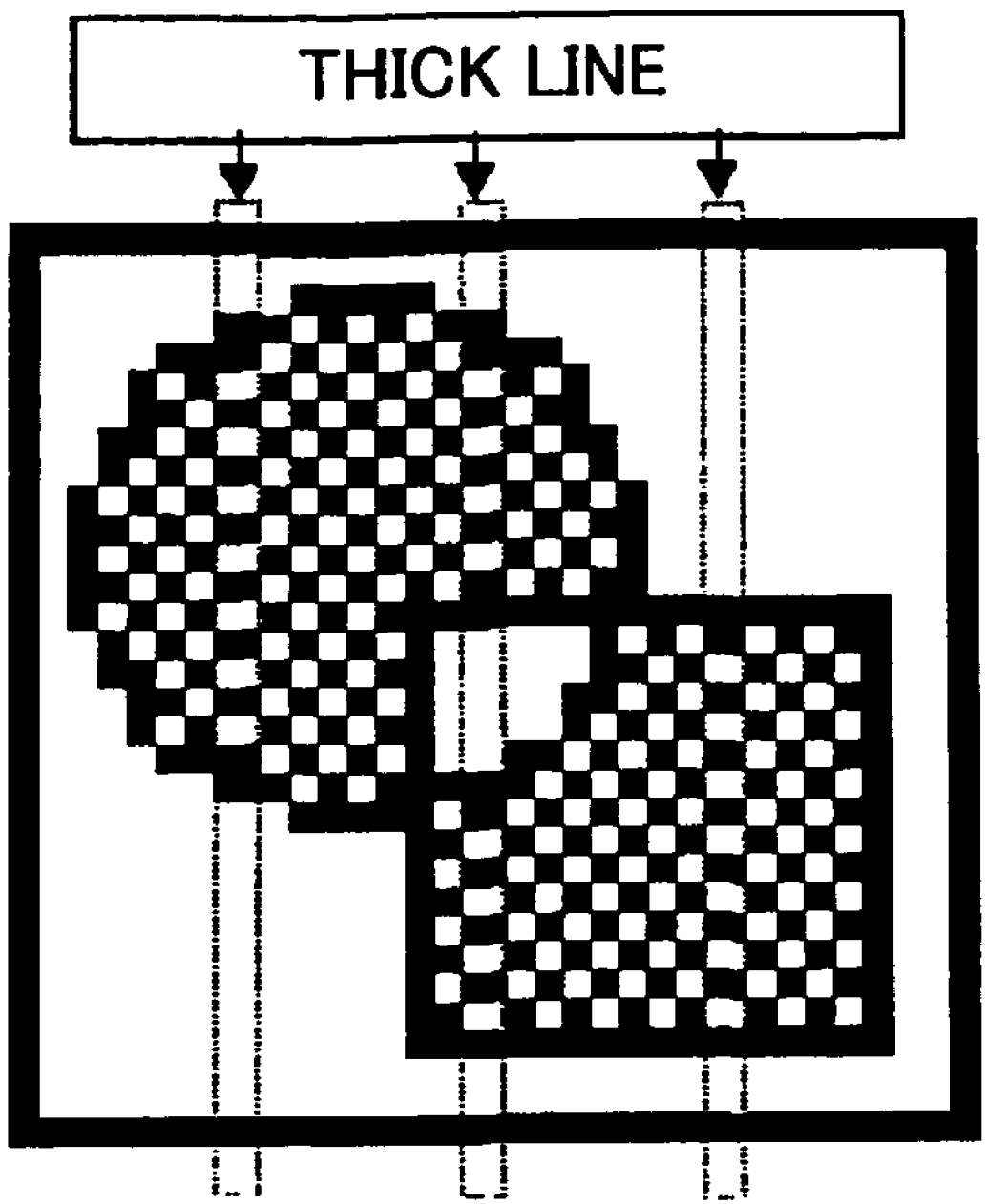
FIG. 5 is an illustration of an example of a result of image formation by moving a distance smaller than a line width.

Moreover, if the same image is repeated a plurality of time as shown in FIG. 5 with a smaller interval than a line width, image missing in the connecting portion can be eliminated but the line width becomes large, which spoils naturalness of the image.

Figure 9:
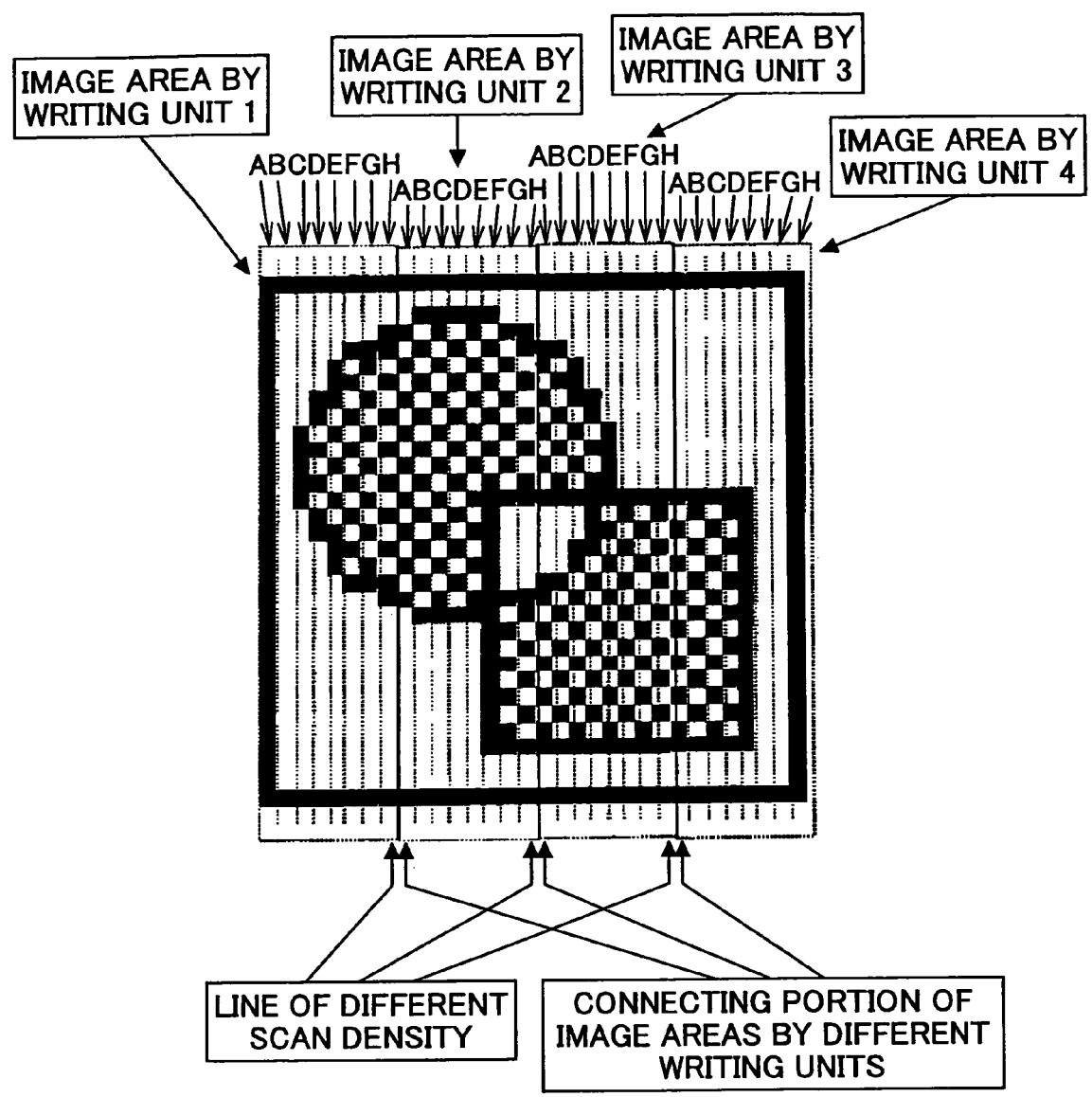
FIG. 9 is an illustration of an example of a result of image formation.

On the other hand, according to the present invention, as shown in FIG. 2C, an amount of misalignment in the connecting portion can be dispersed by writing a final line in the connecting portion of the image formed by each writing unit by changing a density in the writing unit alignment direction, which enables an improvement in an image quality. An example of such a method is shown in FIG. 9.

Moreover, in the present invention, as shown in FIG. 2D, the connecting portion can be made not visible further by changing a line density at an arbitrary position without limiting to a final line so that images of the connecting portion match without misalignment. This is because a misalignment generated in a row of identical dots is less visible than when a misalignment is generated in the connecting portion since a diameter and concentration of dots formed are different due to a difference between the writing units.

Furthermore, it becomes possible to disperse an amount of misalignment of the connecting portion further by changing a density of a plurality of lines. Thus, according to the present invention, an image of which misalignment is hardly visible can be formed by using the method shown in FIG. 2E or FIG. 2F.

In the above-mentioned cases, an amount of misalignment is already known. The following methods may be used to actually obtain an amount of misalignment.

(1) A first method of measuring an amount of misalignment based on an image formed in a state where no correction is made.

(2) A second method of obtaining an amount of misalignment based on write position information of each writing unit measured at a time of head adjustment.

(3) A third method of measuring an amount of misalignment by a write position detector (sensor) of each writing unit mounted to an image forming apparatus.

Figure 3:
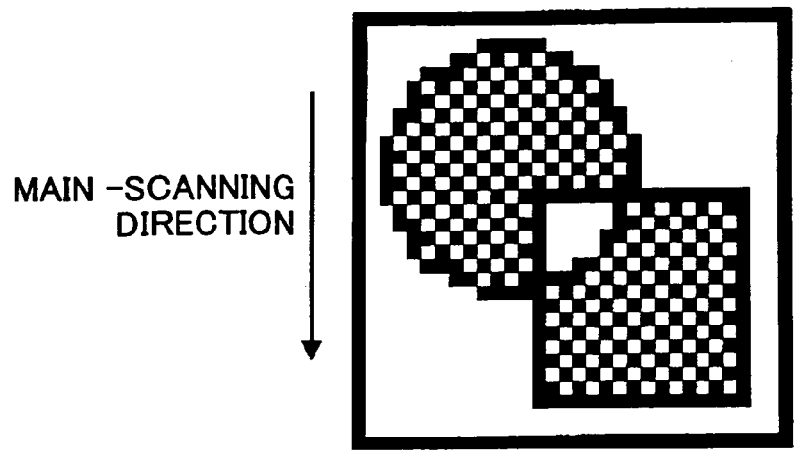
FIG. 3 is an illustration of an original image.
Figure 4:
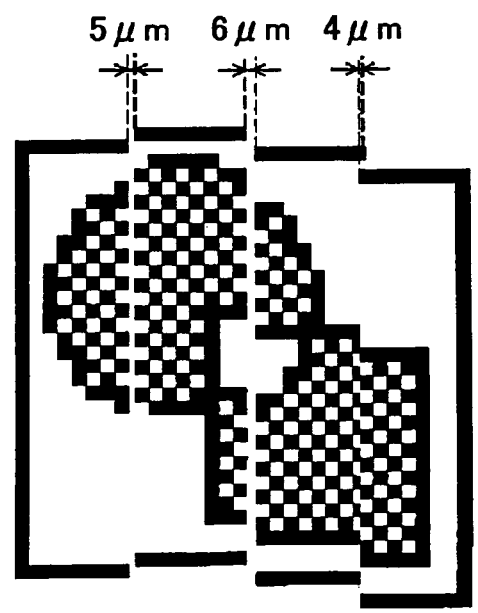
FIG. 4 is an illustration of an example of a result of image formation by a plurality of light-sources having misalignment of irradiating positions.

FIGS. 3 and 4 show the first method. An original image is such as shown in FIG. 3. When writing the image by a head having misalignment in a write position, the formed image may have a gap and an overlap as shown in FIG. 4. This misalignment is measured based on an enlarged image or a photograph obtained by a measuring device such as a loupe, a digital microscope or a microscope.

Figure 6:
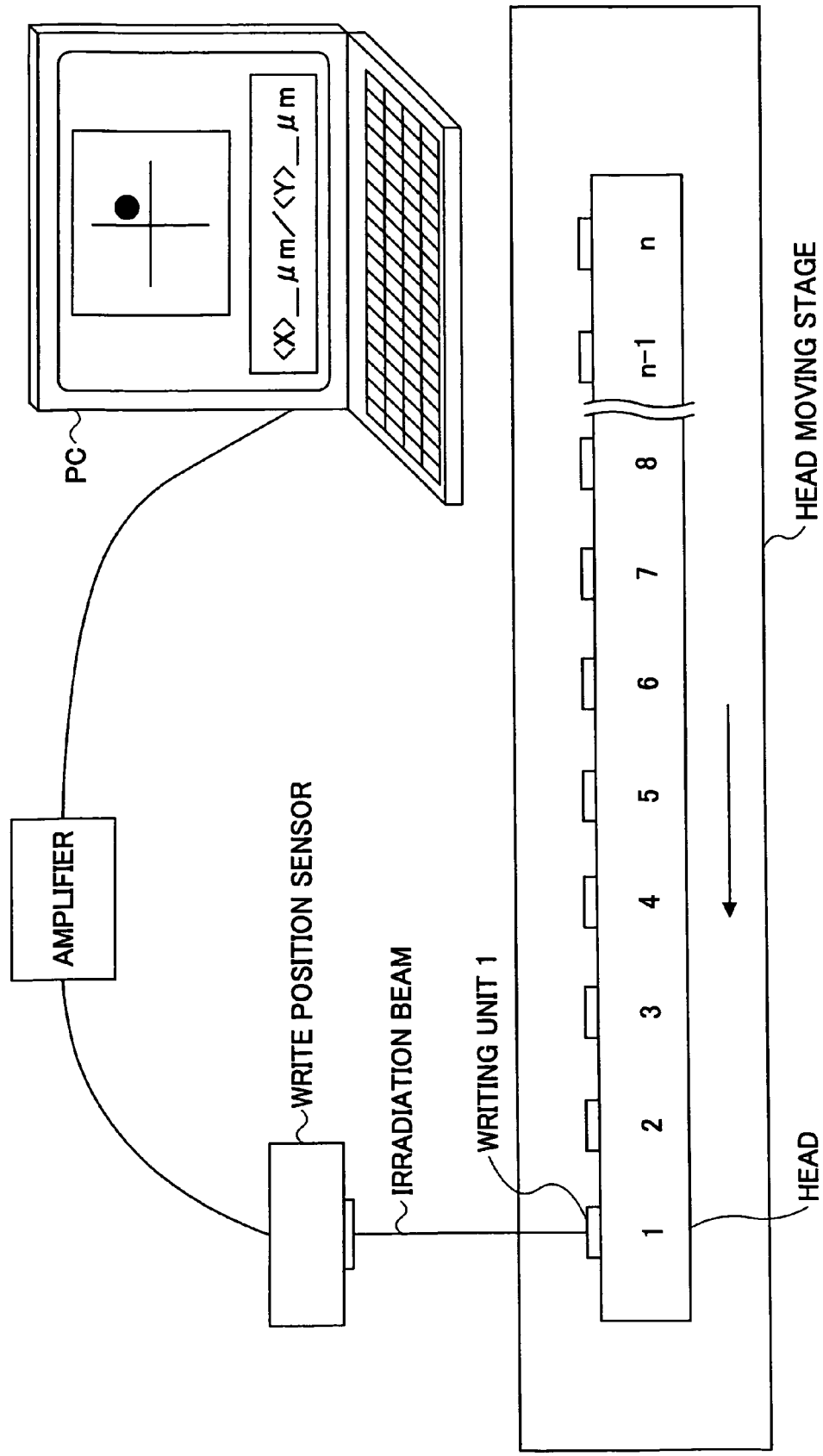
FIG. 6 is an illustration of an example of head adjustment and assembly and acquisition of write position data.

FIG. 6 shows an example of the second method. FIG. 6 is an illustration of an assembly adjust system of writing units, which includes a plurality of writing units and a head to which the writing units are mounted and a write position detection system.

The object to attach differs by a head structure, each part or assembling method thereof, such as a writing unit to a head body or an optical system (lens, light source) of lighting units mounted on the head. For example, if the write unit is a semiconductor laser (hereinafter, referred to as LD), it is a position adjustment of the LDs, various lenses including a light converging lens, an optical fiber, a mirror such as a polygon mirror or a MEMS mirror, and it changes due to a structure of the optical system and assembling and adjusting method thereof.

In each structure, a write position detection sensor is located at a position where writing is finally performed on a recording medium. The write position information of each writing unit, which is a sensor output, is amplified by an amplifier and is subjected to an analog-to-digital conversion (A/D conversion). The digital data is collected by a personal computer (PC) or the like to obtain the write position data of each writing unit.

If the writing units are LDs, irradiated positions of beams can be detected using a sensor such as a PSD or a CCD.

It should be noted that the same number of detection sensors as the writing units may be arranged to face the writing units, respectively. Alternatively, the detection sensor may be moved sequentially to face each of the writing units, or the head having the writing units may be moved so that the writing units face the detection sensor sequentially. However, when moving the detection sensor or the head, it is required to use a stage that can perform a high resolution movement with a highly accurate repeatability. For example, a stage using a minutely drivable actuator such as a voice coil and having a control system provided with a high resolution encoder or a linear scale may be used. Or, a stage having a high resolution motor, a control mechanism of the motor or an accurate ball screw to convert a rotation of the motor into a linear movement may be used.

Figure 7:
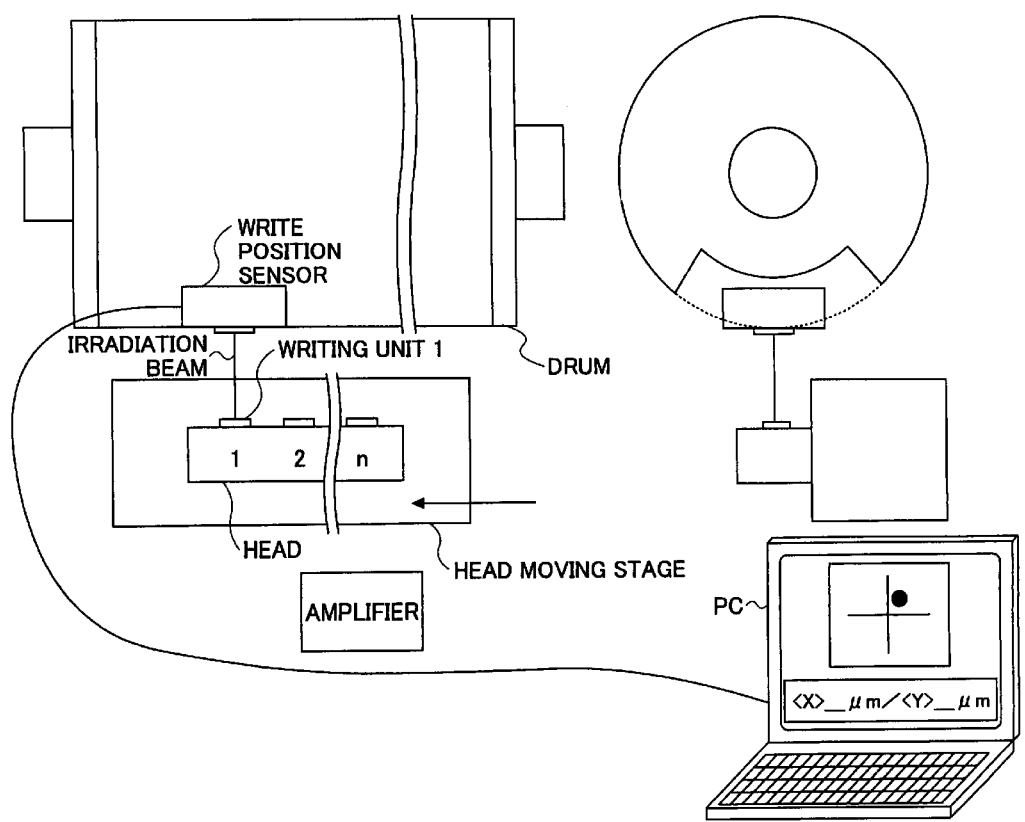
FIG. 7 is an illustration of an example of acquisition of write position data by a write position sensor.

FIG. 7 shows the third method. FIG. 7 shows an example of an image forming apparatus having a write position detection sensor for a plurality of writing units. The image forming apparatus comprises a drum supporting a recording medium thereon and having a recessed portion, the write position detection sensor located in the recessed portion of the drum, and a head facing the write position detection sensor.

The measurement is applied from the writing unit positioned at an end, and sequentially applied to all of the writing units by moving the position detection sensor or the head. After the measurement, the position detection sensor is retained in a location, which does not cause a problem in an image forming process applied to a recording medium.

Thus, since the measurement is taken under the actual condition of forming an image on a recording medium, an accurate position correction can be performed unless the head is removed.

It should be noted that the output of the position detection sensor is displayed on a monitor in FIGS. 6 and 7 since the condition of the measurement cannot be completely the same as the condition of forming an image on the recording medium according to the second and third methods and there may be a small error occurs. In such a case, since a function of correcting the error is needed, the display of the output of the position detection sensor is used for inputting the error or displaying a beam profile so as to perform an accurate adjustment. As mentioned above, a small error may occur in the second and third method, but the condition setting can be made easily to a state where the measuring condition almost match the actual condition, and, thus, a work efficiency is remarkably improved.

Furthermore, a concentration correction of an image can be simultaneously performed by performing an output adjustment of the writing units or a beam profile adjustment periodically or performing when it is requested, thereby achieving image formation of a higher quality.

Figure 8:
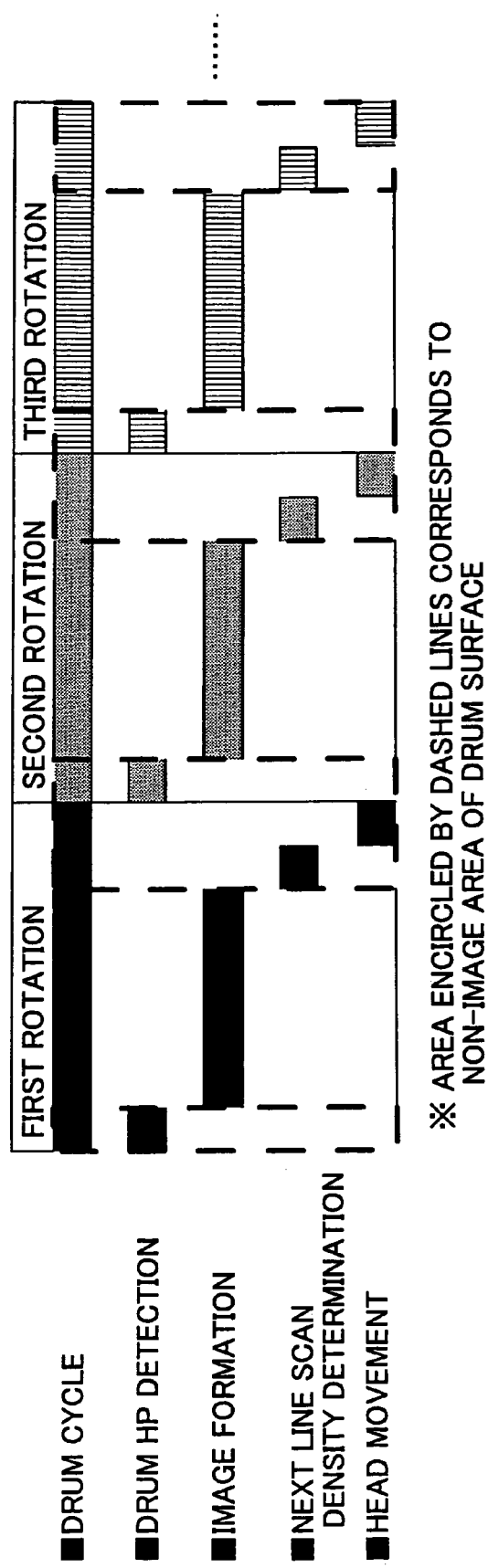
FIG. 8 is an illustration of an example of each process within a drum rotation cycle.

The correction of a connecting portion by changing a scanning density in the direction of alignment of the writing units was explained with reference to FIG. 2. In order to perform the correction, it is needed to move the write head or the recording medium to an appropriate position before performing line formation of a next line. The position to move is acquired from the data of an amount of misalignment. Accordingly, it is needed to calculate control parameters of the stage, which moves the write head or the recording medium, by recognizing the data of an amount of misalignment or acquiring the control parameters by referring to a table. A time from acquisition of the control parameters to cause the stage to move is limited to duration after completion of scanning of the image area until a start of scanning of the image area of a next line as shown in FIG. 8. It should be noted that the example of FIG. 8 is a case of the drum rotation scanning method. According to the plane scanning method, a time of acquiring the control parameters of the stage and a time of moving the stage are extremely short. However, if it cannot be achieved within the limited time, the formed image may be deteriorated.

Accordingly, for example, in the case of the drum rotation method, it is necessary to use a method of preparing a table of the control parameters and sequentially read the control parameters without expanding a blank area or calculating the control parameters for each line. Additionally, according to the plane scanning method, it is necessary to perform high speed processing by preparing the control parameters, which change an angular displacement amount or a velocity of a mirror, and reading the control parameters at high speed, or preparing the control parameters, which determine a transfer timing of image data If the change of scanning density is performed simultaneously at the same line in all of the writing units, there is no problem. However, if the change of scanning density is performed at different line in each writing unit, the writing units other than the writing unit which forms an image by changing the line density must not perform image formation of the line concerned.

Figure 10:
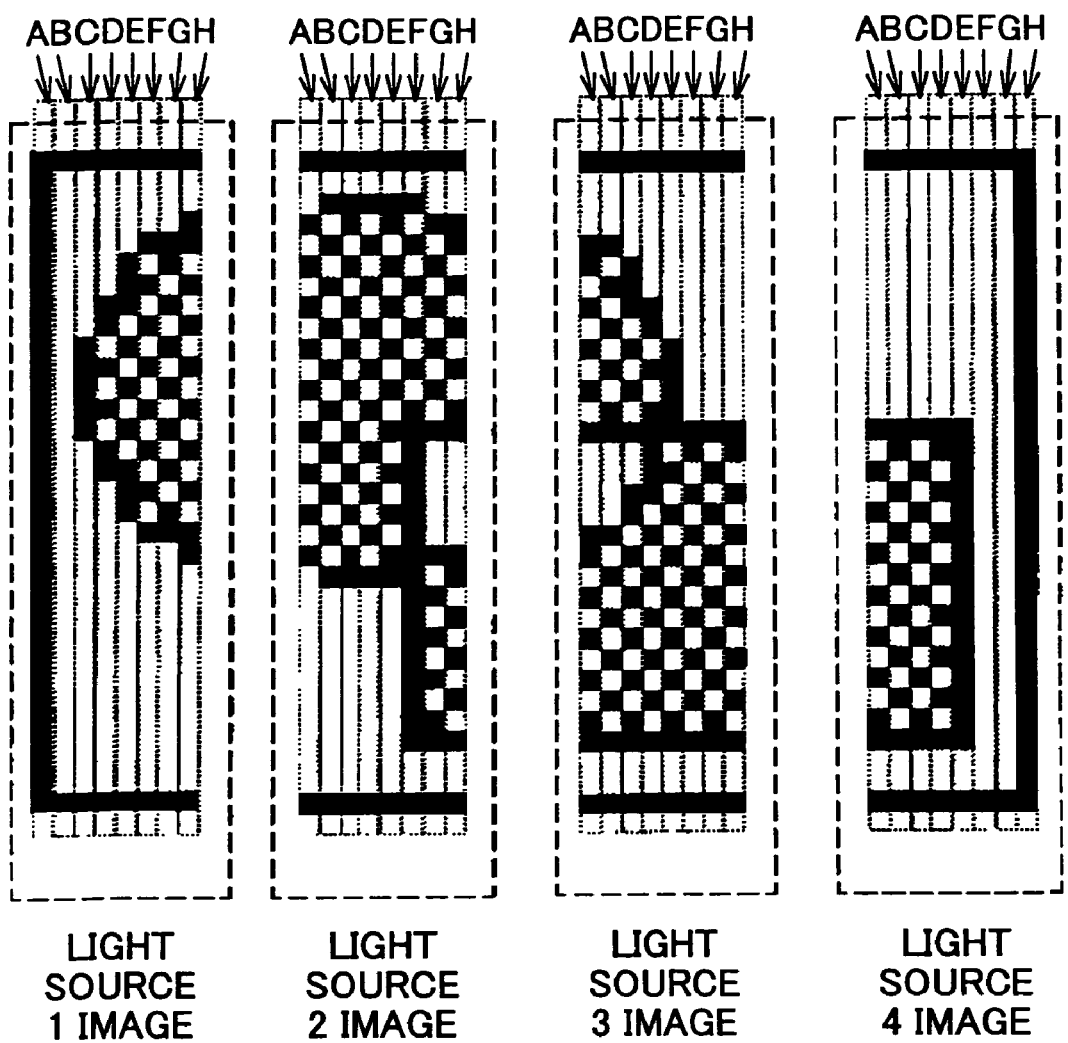
FIG. 10 is an illustration of an example of sharing of mage formation area by light-sources.

Therefore, although image shown in FIG. 10 is shared by the plurality of writing units so as to form the image shown in FIG. 9 is there is no misalignment in write positions of the write units, if the writing units changes the line density at different lines, for example, if only the writing unit 1 uses a different density at a line E, other writing units 2-4 use blank data so that the line E is not written. Then, for a next line, the write position is corrected to a position obtained from an original interval, and blank data is input as E' so that only the writing unit 1 does not write and other writing units 2-4 write the line E' instead of the line E.

According to the above-mentioned methods, image formation with corrected position misalignment can be performed. It should be noted that FIGS. 12 and 13 show examples of the head moving method relating to the above-mentioned writing methods.

Figure 12:
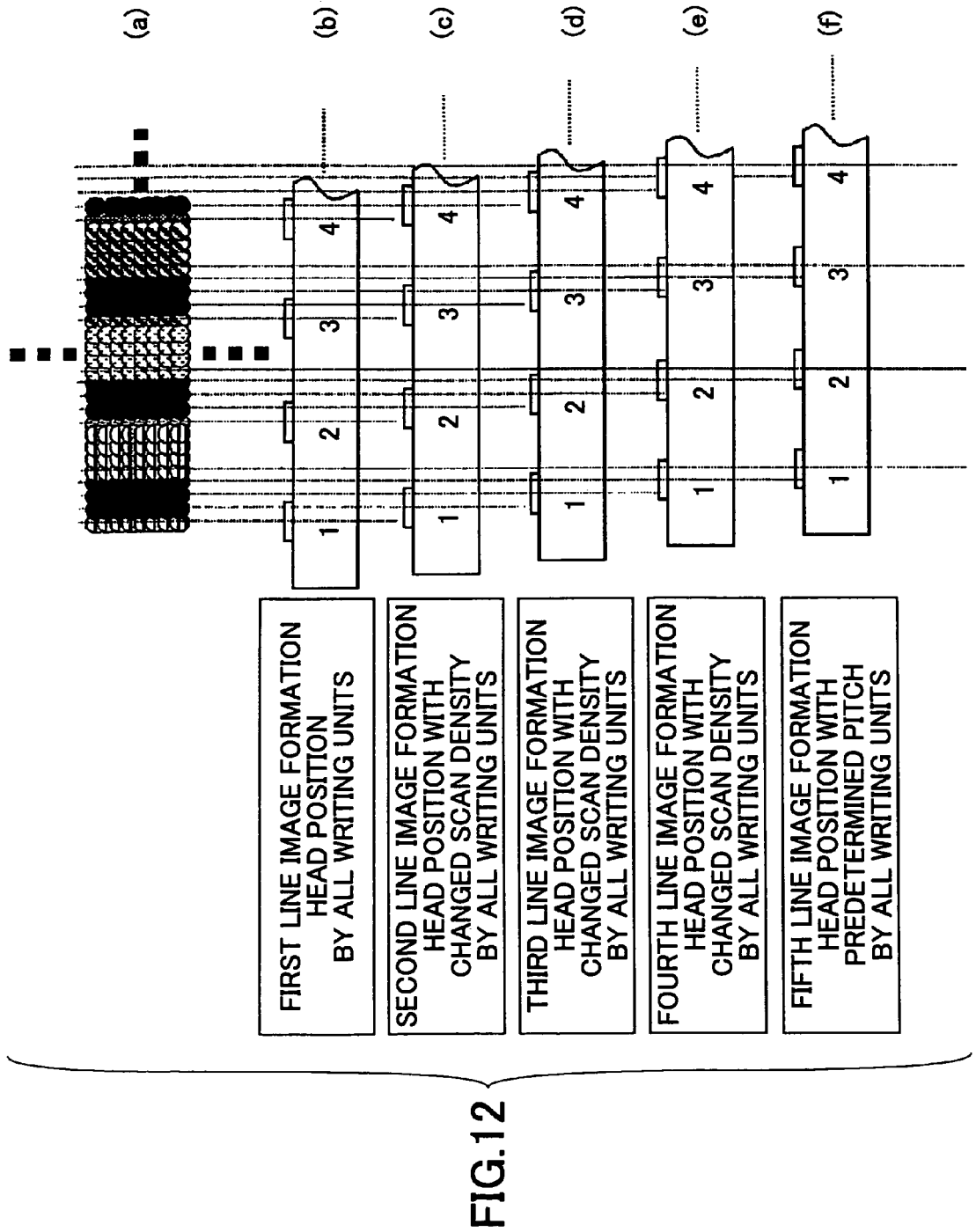
FIG. 12 is an illustration of a method of moving a head.

The example of FIG. 12 is a case where all of the writing units change simultaneously the scanning density for the second through fourth lines to form an image. Accordingly, after writing the first line, the head is moves to a position different form the predetermined position, and an image is formed by all of the writing units. This operation is performed for three lines, and, thereafter, the image formation is continued with the predetermined pitch.

At this time, if only the writing units 2-4 have a write position misalignment and the writing unit does not have a misalignment, or if an amount of misalignment differs from the writing unit 1 to the writing units 2-4, it is natural that the writing unit 1 writes a line with a different density than that of the writing units 2-4. However, if there is no significant difference between the amounts of alignment and influences to the image quality are negligible, a method of writing by changing simultaneously the scanning density of all of the writing units may be used to attempt a reduction in the write time.

Figure 13:
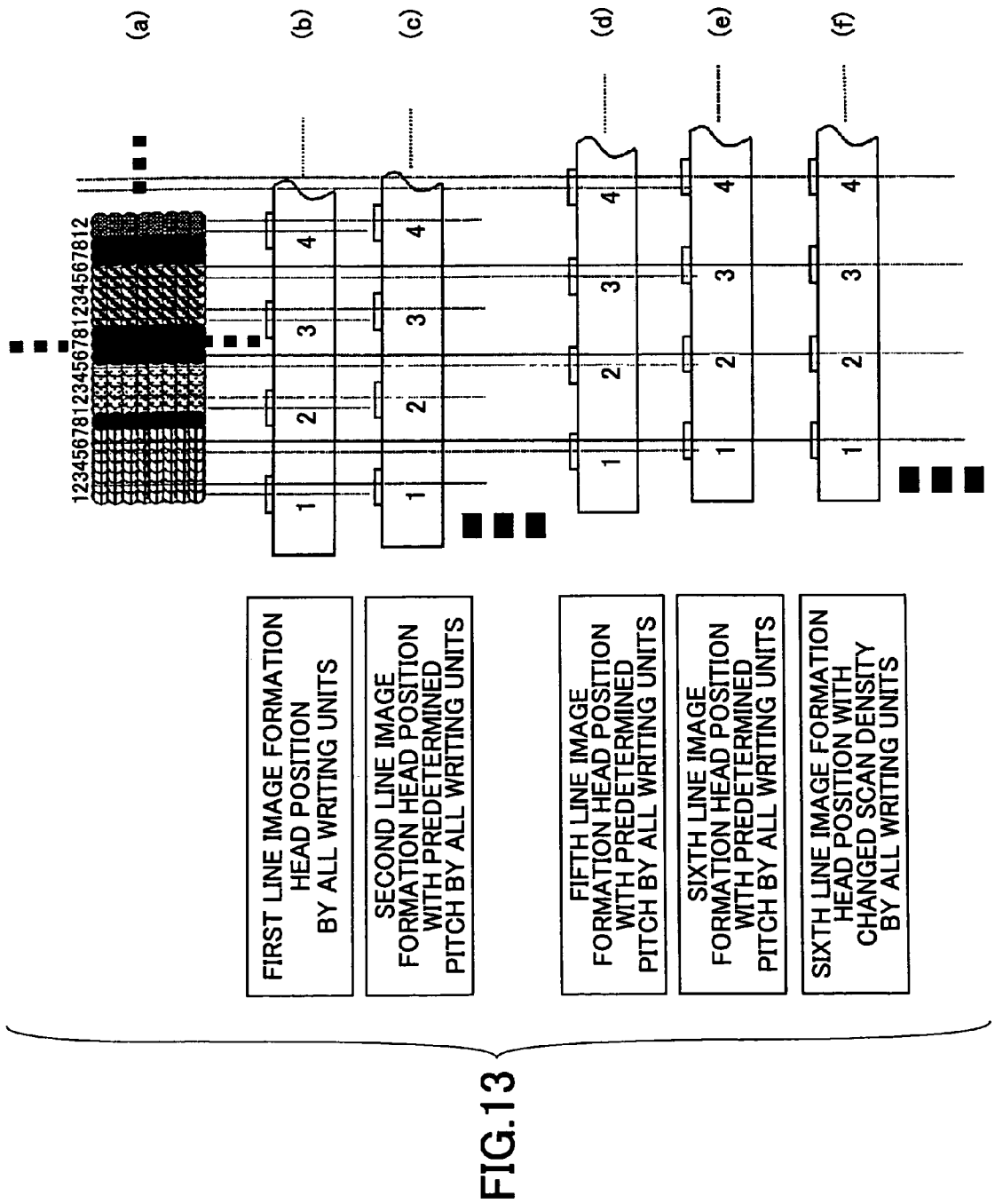
FIG. 13 is an illustration of another method of moving a head.

On the other hand, the example of FIG. 13 is a case where an amount of positional misalignment differs slightly between the writing units and a scanning density is not changed simultaneously.

Although all writing units write with a predetermined density for the first five lines, the writing units 1 and 3 perform image formation with the predetermined density and the writing unit 2 performs image formation with a different density. Subsequently, only the writing unit 1 forms an image of the seventh line, and then the writing units 2 and 3 simultaneously or one of them forms the seventh line image with a scanning density different from the predetermined density.

It should be noted that the misalignment of the write position does not only result in generation of a gap but also result in an overlap. Accordingly, although not shown in the figures, the different density for forming the lines may be smaller than the predetermined density (when a gap becomes large) or may be larger that the predetermined density (when an overlap is generated).

The above-mentioned is a case where the write position misalignment of the writing units absolutely or relatively falls within a misalignment of less than a width of a single line. If the misalignment is equal to or greater than the width of the single line, it is necessary to change a width of an image assigned to each of the writing units. Such an example is shown in FIG. 14.

Figure 14:
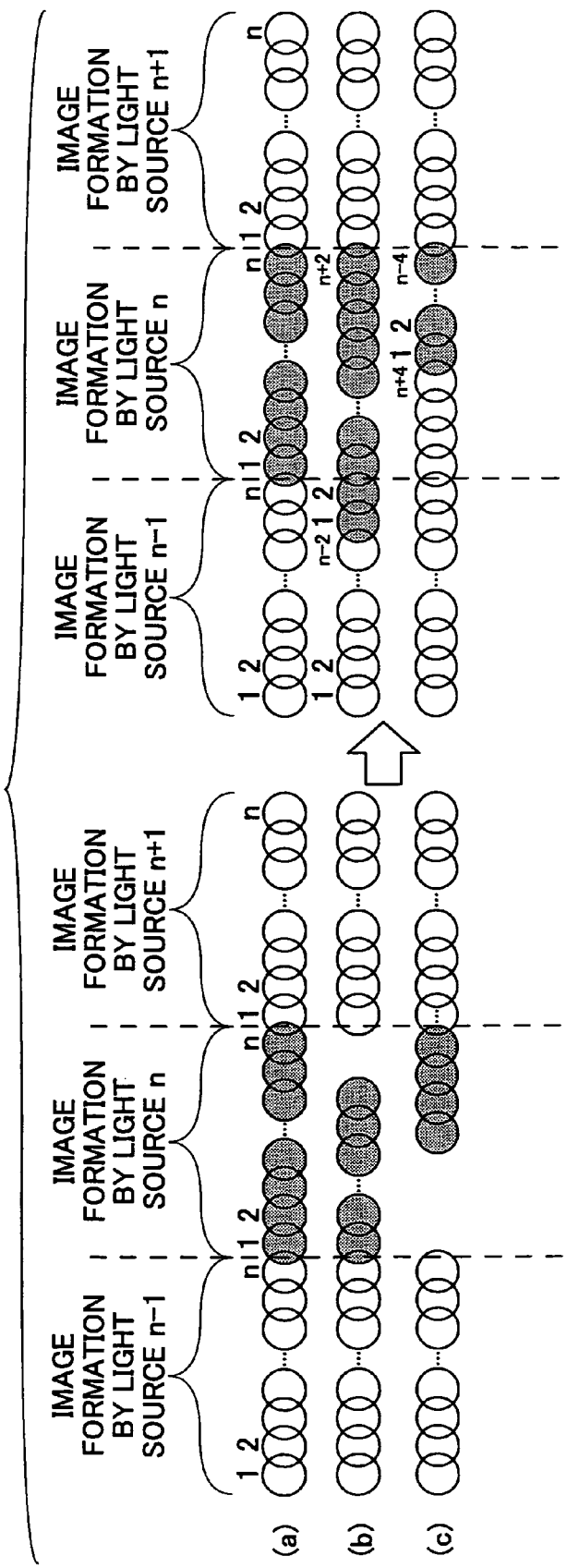
FIG. 14 is an illustration of a method of correcting an amount of misalignment according to the present invention.

FIG. 14-(A) shows an example of a case where there is no misalignment in the write position of all of the writing units. FIG. 14-(B) shows an example of a case where the nth writing unit shifts toward the (n−1)th writing unit by a distance of about 2 dots. FIG. 14-(C) shows an example of a case where the nth writing unit shifts toward the (n+1)th writing unit by a distance of about 4 dots.

In the case of (B), an image having no unnaturalness in a connecting portion can be formed by deceasing the width of the image to be formed by the (n−1)th writing unit by a distance corresponding to 2 lines and increasing the width of the image to be formed by the nth writing unit by a distance corresponding to 2 lines.

Besides, there is a method in which a timing of writing of the nth writing unit is delayed by a time corresponding to 2 lines and only the writing unit 2 writes the last 2 lined and the image formation is ended. Thus, it is necessary to determine the method to use by considering a condition of misalignment of other writing units.

Although the case of (C) can be dealt, similar to the case of (B), by increasing the width of the image to be formed by the (n−1)th writing unit by a distance corresponding to 4 lines and decreasing the width of the image to be formed by the nth writing unit by a distance corresponding to 4 lines, a method described below using an example of FIG. 15 may be used.

In order to correct the above-mentioned misalignment efficiently, it is necessary to devise the order of driving each of the writing units and the image data made to be shared by the writing units. Such examples are shown in FIGS. 15 and 16.

Figure 15:
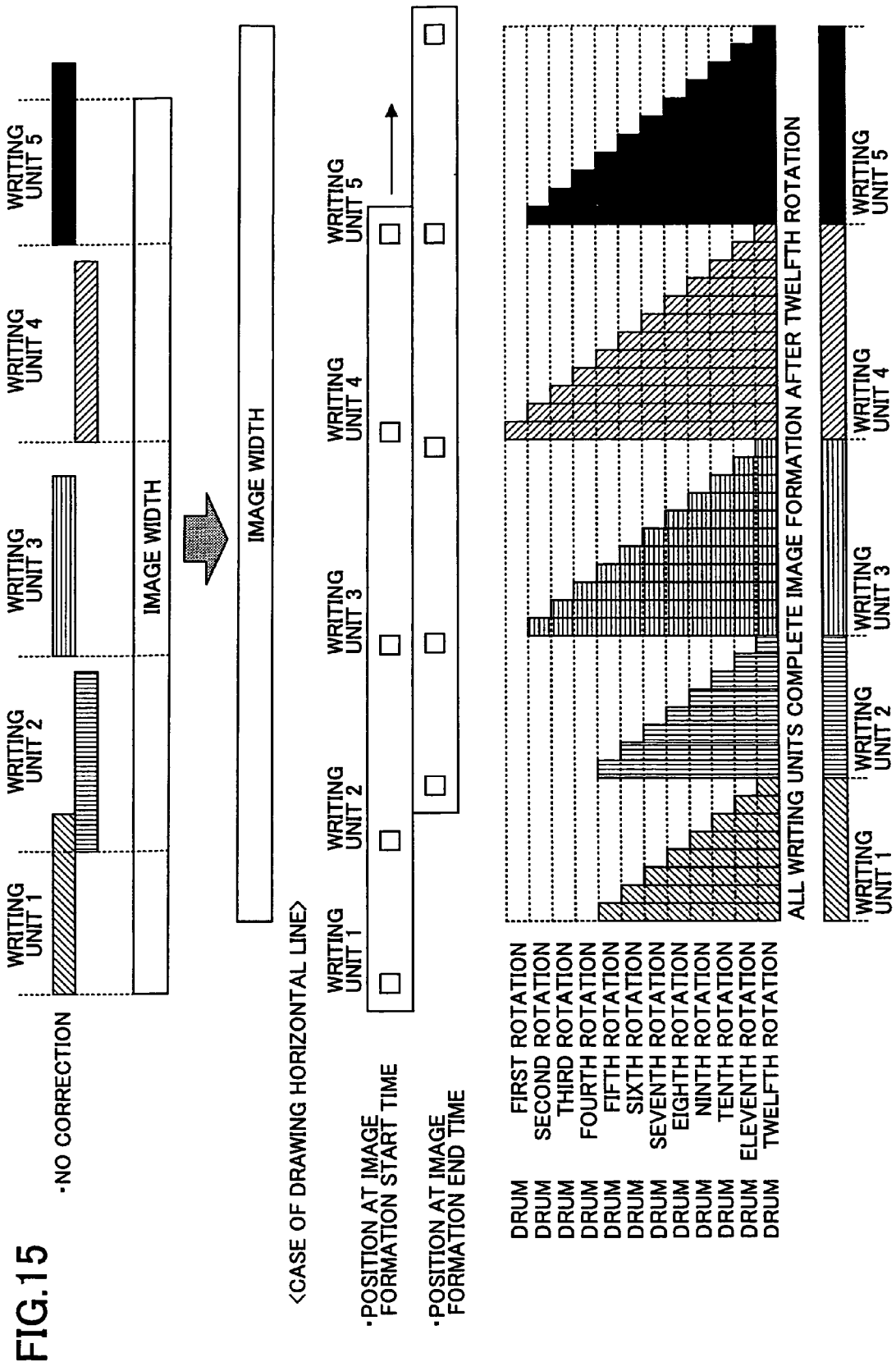
FIG. 15 is an illustration of another method of correcting an amount of misalignment according to the present invention.
Figure 16:
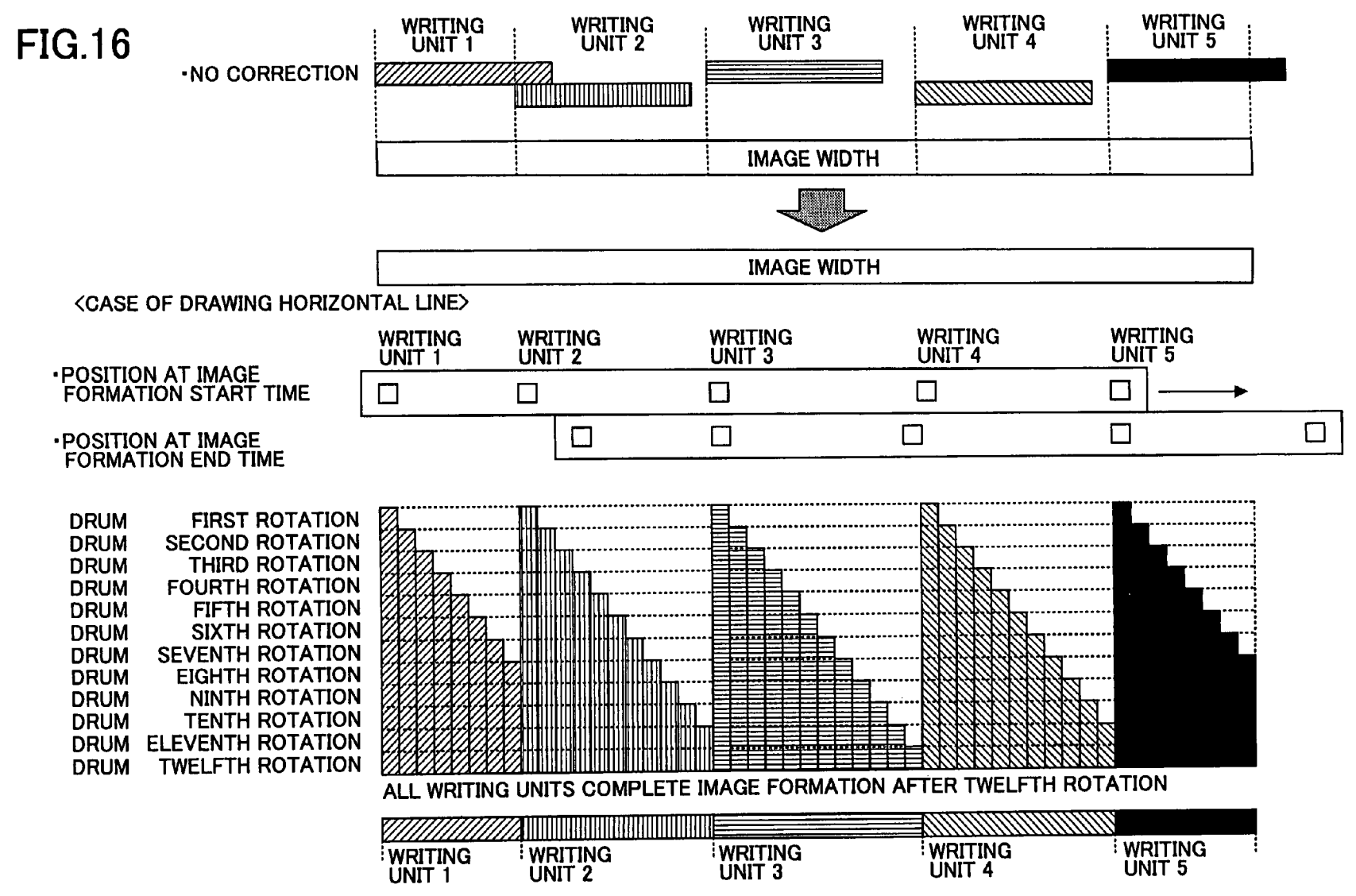

FIGS. 15 and 16 are examples of cases where the writing units have different misalignments, respectively. The method shown in FIG. 15 causes the writing units having different misalignments to start at different times and end the writing simultaneously. The method shown in FIG. 16 causes writing to start at the same time and end the writing at different times.

In the example of FIG. 15, the writing unit 4, which has a largest gap between the adjacent writing unit and located in a head moving direction, first starts to perform image formation. The sole writing unit 4 continues the image formation until the image formation of one line, which is a difference between the writing units 3 and 5 having a second largest gap between the adjacent writing unit, is completed. Subsequently, in a second rotation of the drum, the writing units 3 and 5 start image formation, and, thereafter, only the writing units 3, 4 and 5 perform image formation until fourth rotation of the drum. Then, the writing units 1 and 2 start image formation from the fifth rotation, and all the writing units end the image formation at the same time.

However, this is an example of the case where a misalignment less than a line width dose not exist in write positions of all of the writing units. If there is a misalignment less than a line width exists, a correction of the misalignment is performed in the middle or at the end of the writing process. It should be noted that if the misalignment of less than a line width is the same for all of the writing units, writing can be performed simultaneously at the end by moving the same scanning density, thereby enabling attempt to reduce the writing time.

On the other hand, in the example of FIG. 16, all the writing units start writing at the same time, and the image formation is ended in an order of the writing unit, which has a smaller position interval with the adjacent writing unit, ending first.

According to this method, there is an advantage that a wiring unit having a failure can be easily found since all the writing units are driven first. It should be noted that the present example is also the case where a misalignment less than a line width dose not exist in write positions of all of the writing units. If there is a misalignment less than a line width exists, a correction of the misalignment is performed in the middle or at the end of the writing process. It should be noted that if the misalignment of less than a line width is the same for all of the writing units, writing can be performed simultaneously at the end by moving the same scanning density, thereby enabling attempt to reduce the writing time.

Figure 17:
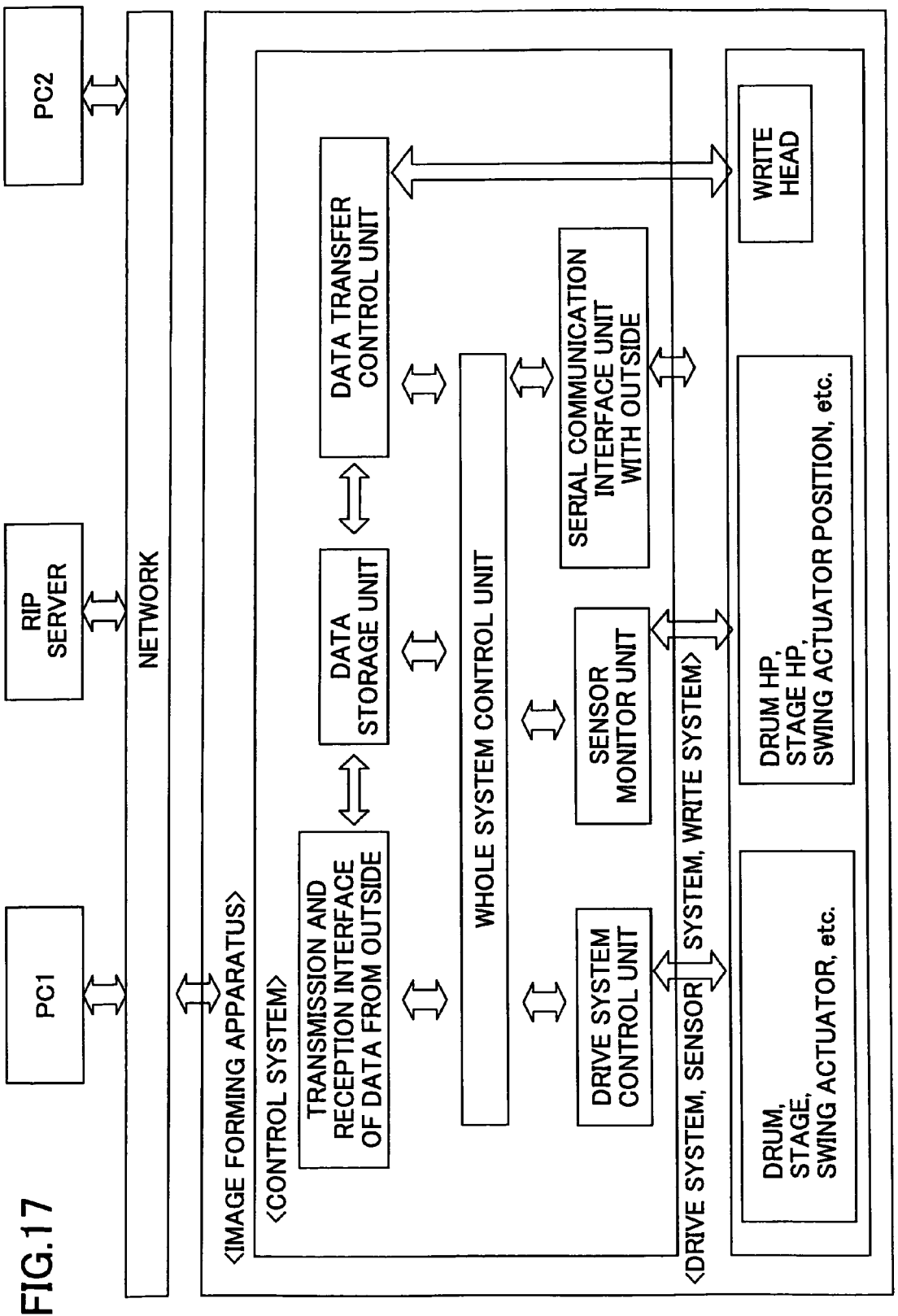
FIG. 17 is a block diagram of a system provided with an image forming apparatus according to the present invention.

FIG. 17 shows a block diagram of an image forming apparatus using the above-mentioned image forming methods. FIG. 18A through FIG. 22 show examples of a medium to be used. FIGS. 23A and 23B show a printing apparatus using the above-mentioned image forming methods.

In the system of FIG. 17, each PC (client) connected to a network requests to an RIP server RIP processing and/or picture formation processing to a record medium. The RIP server performs the RIP processing and transfer the raster data or stored data which has been already RIP-processed to picture formation equipment. The transferred data is stored sequentially in a buffer, and after a start of a mechanical system, a data transfer is performed from the buffer to a write head based on a predetermined synchronization signal so as to perform image formation to the recording medium. The state of apparatus is monitored by an external monitor through a serial interface, and the image forming conditions and the condition of the RIP processing are also checked by the client PC.

The recording medium which the present invention uses as an object may be a medium which is writable in an optical mode or a thermal mode. The present invention can be used in a recording process to form a charged state corresponding to image information by irradiating a laser onto a previously charged photosensitive material such as in a so-called electrophotographic process, or may be used in a thermal transfer recording method such as a heat melting type or a sublimation type.

As an example of a photosensitive transparent film use as a recording medium, conventionally, there is a silver salt film, which is processed through process of development, fixation, water-cleaning and dry. Recently, there is a film of a type which is developed by applying a heat to a film recorded according to a photosensitive method by a laser.

Figure 18A:
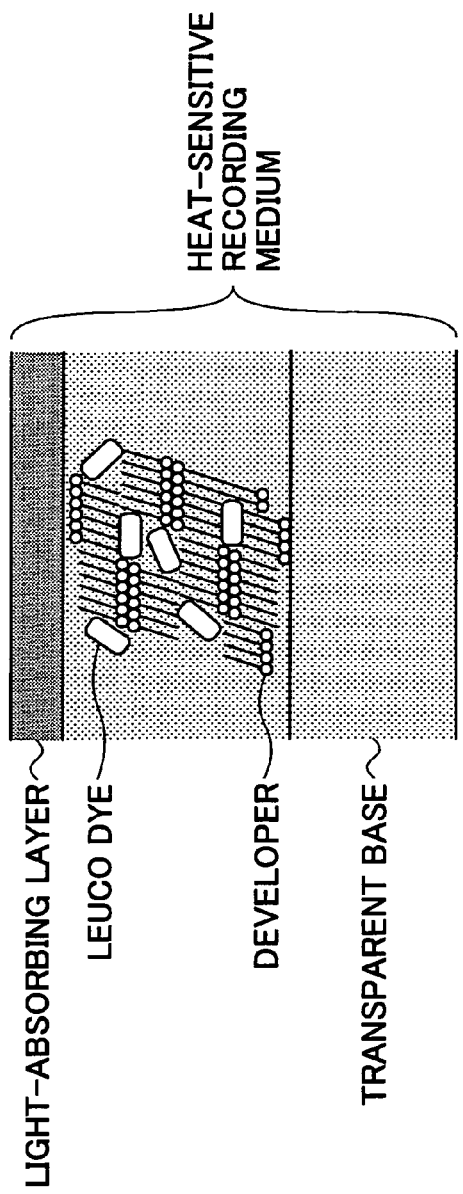
FIG. 18A is an illustration of a part of a recording medium using a heat-sensitive transparent film.

As an example in which a recording medium is the photo-sensitive transparent film, there is one shown in FIG. 18A. This recording medium has a structure, as shown in FIG. 18A, in which an irradiation light is changed into a heat in a light absorbing layer so as to cause a leuco dye and a developer contained in a recording layer of a lower layer to react with each other to generate a color. The recording medium forms a state of relatively colored and decolored state according to heating and/or cooling speed after heating. The basic coloring and decoloring phenomenon will be explained by referring to FIG. 18B.

Figure 18B:
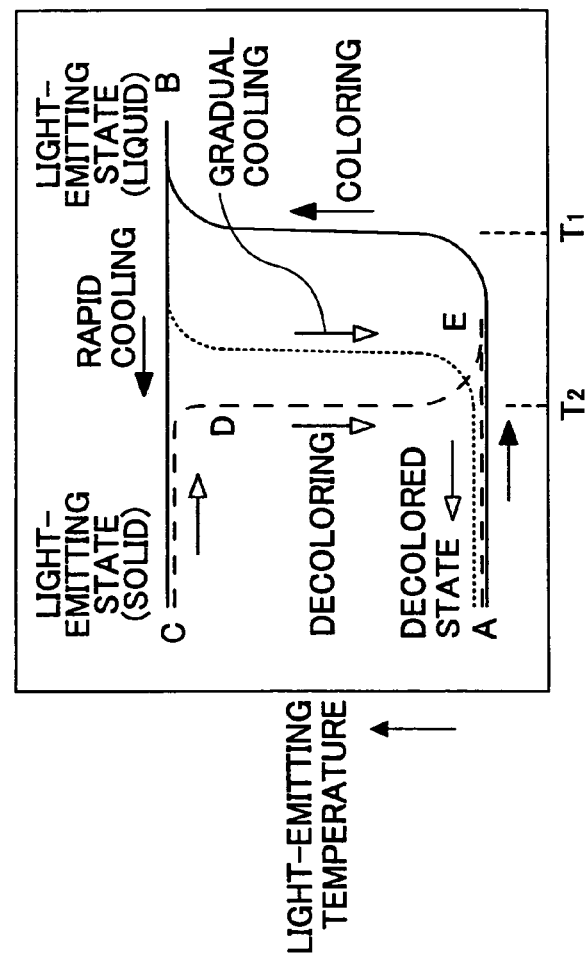
FIG. 18B is an illustration of a relationship between a color concentration and a temperature.

FIG. 18B shows a relationship between a color concentration of the composition and a temperature. When a temperature of the composition in a decolored state (A) is raised, coloring occurs at a temperature T1 at which the composition starts to melt, and set in a melted-coloring state (B). If the composition at the melted-colorant state is rapidly cooled, the temperature of the composition is decreased to a room temperature while it maintains the coloring state, which results in a solidified coloring state (C). Whether or not this coloring state is obtained depends on a temperature-decreasing speed from the melted state. In a gradual cooling, decoloring occurs in a process of temperature-decreasing, which results in the decolored state (A) the same as the initial state or a state where the concentration is lower than that in the rapidly cooled coloring state (C). On the other hand, the temperature is raised again from the rapidly cooled coloring state (C), decoloring occurs at a temperature T2 which is lower than the coloring temperature ((D) to (E)), and if the temperature is decreased at this point, the state return to the decolored state the same as the initial state. Actual coloring temperature and decoloring temperature vary according to a combination of a developer and a colorant, and they can be selected as desired. Additionally, the concentration of the melted coloring state and the coloring concentration when rapidly cooled do not always match, and there may be a case where they differ from each other.

Therefore, when writing in the medium, the coloring recording is performed by heating at a temperature at which melting and fusing occurs by a laser light source or a thermal head. Additionally, there are two methods for decoloring, one being a method of gradually cooling from decreasing and the other being a method of heating at a temperature slightly lower than a coloring temperature. However, these two methods are the same in the sense of phase separation between a developer and a colorant or temporarily maintaining at a temperature at which at least one of a developer and a colorant crystallizes. The reason for rapidly cooling at the time of coloring is to not keeping at the above-mentioned phase separation or crystallization temperature. However, the rapid cooling or gradual cooling is relative to one composition, and since a boundary thereof changes according to a combination of a colorant and a developer, it is necessary to perform a temperature control according to a composition to use.

Figure 19A:
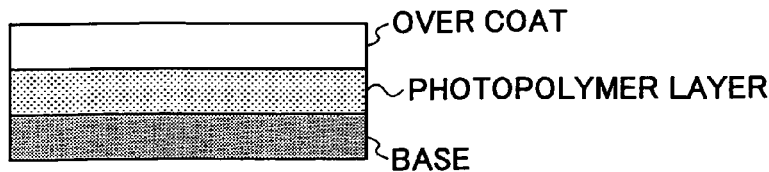
FIG. 19A through 19D are illustrations of recording media of a direct writing type.
Figure 19B:
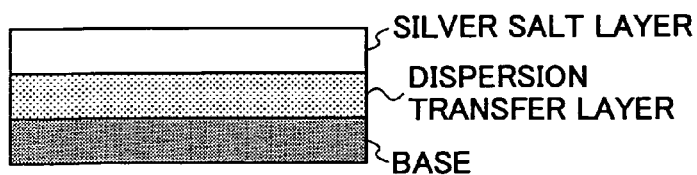
Figure 19C:
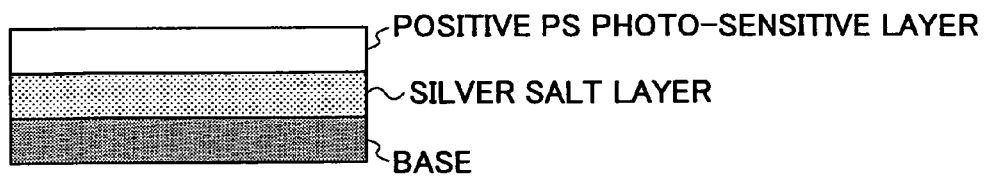

Moreover, the object in the case of writing directly on a plate such as the CPT plate, there are photo-sensitive type and a heat-sensitive such as materials shown in FIGS. 19A through 19D, FIG. 21 and FIG. 22. The photo-sensitive type includes a high-sensitive polymer CTP plate such as shown in FIG. 19A, a silver salt diffusion transfer CTP plate such as shown in FIG. 19B and a hybrid type CTP plate such as shown in FIG. 19C. Any one can be recorded by a low output laser light.

Figure 19D:
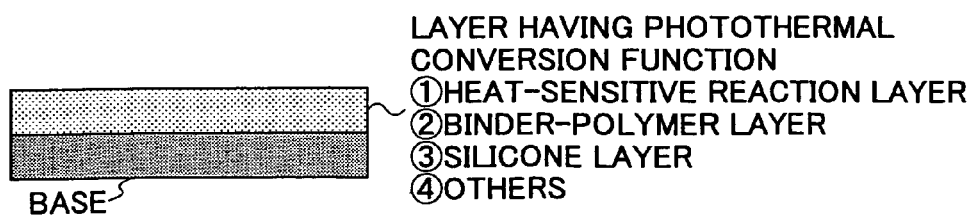

The heat-sensitive type has a structure as shown in FIG. 19D, and includes a thermal negative, a thermal positive, abrasion and phase-change. There is a type which can be treated in a bright-light room.

The present invention can use any type of recording medium, and any of types of a moisturizing type, a negative type, a positive type dampening water use type a negative type and positive type can be used. However, in the present condition, all the above-mentioned record media need a certain pretreatment or post-treatment such as chemical processing, heating processing or cleaning.

On the other hand, the following recording media allow fabrication of a printing plate without any processing before or after image formation.

Figure 21:
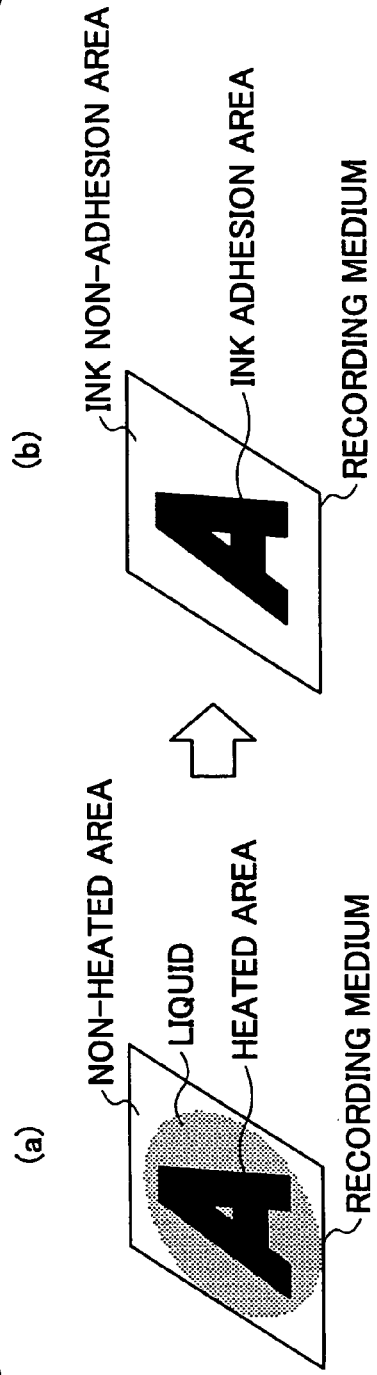
FIG. 21 is an illustration of another example of the recording medium.

FIG. 21-(A) shows the recording medium for forming an image by setting an initial state of the recording medium to be an entire surface ink repellent state and bringing the surface of the recording medium into contact with a liquid and heating an image area. FIG. 21-(B) shows a result of development of the recording medium by ink.

The recording medium has a surface characteristic in which a receding contact angle is decreased when contacting with a liquid in a heated state and the receding contact angle is increased when it is heated in a non-contacting state. An image can be formed on the recording medium due to a decrease in the receding contact angle in a heated portion of the surface of the recording medium by heating the image area in a state where the surface thereof is in contact with a material selected from a group consisting of a liquid, a vapor and a solid. Alternatively, an image can be formed by causing the surface of the recording medium to contact with a material selected from a group consisting of a liquid, a vapor and a solid immediately after heating the surface in accordance with image information. This recording medium is used as a plate for offset printing.

This recording medium may have a structure in which a light-absorbing layer is provided on a surface of a substrate such as a plastic, metal or paper and the recording material layer having the above-mentioned characteristic is formed on the light-absorbing layer, of a structure in which a recording material layer containing a light-absorbing material is formed on a substrate.

Figure 22:
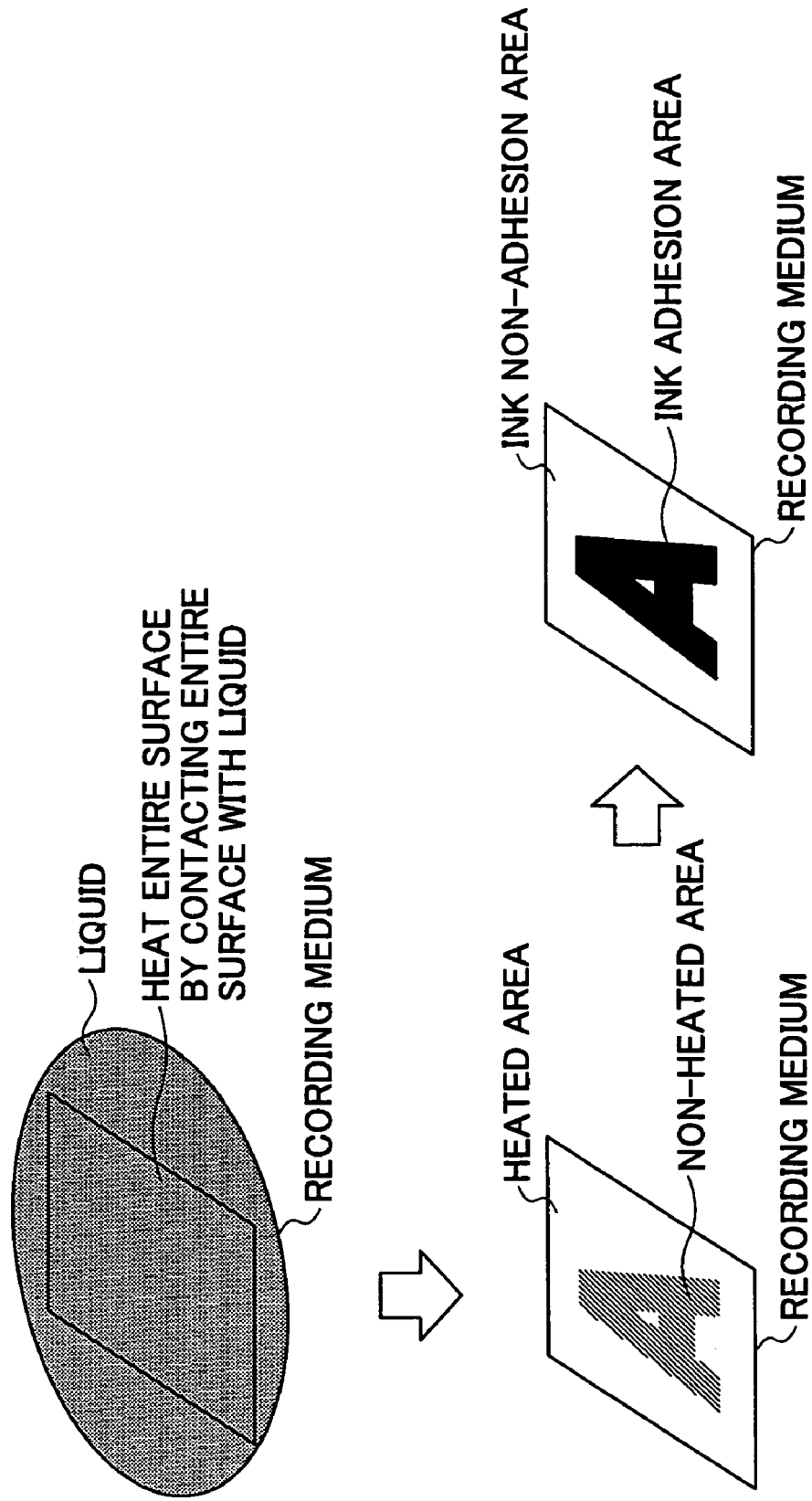
FIG. 22 is an illustration of another example of the recording medium.
Figure 23A:
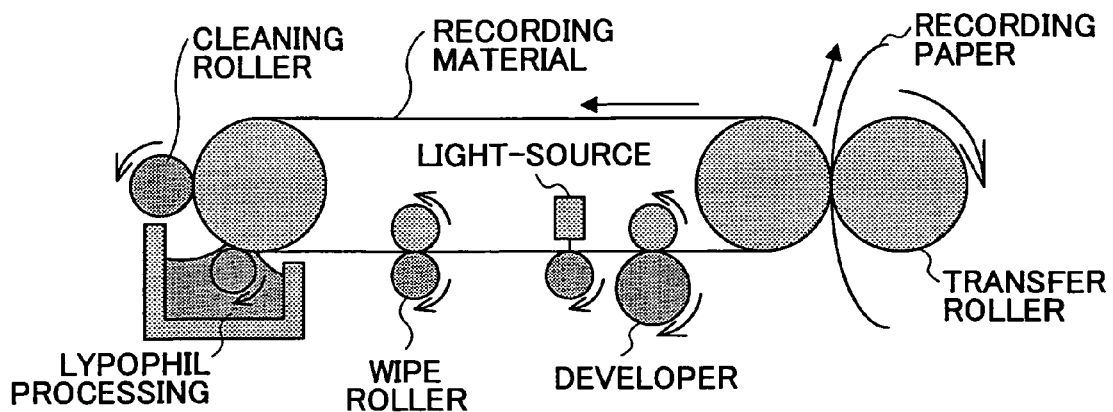
FIGS. 23A and 23B are illustrations of examples of a printing apparatus performing an image forming method according to the present invention.
Figure 23B:
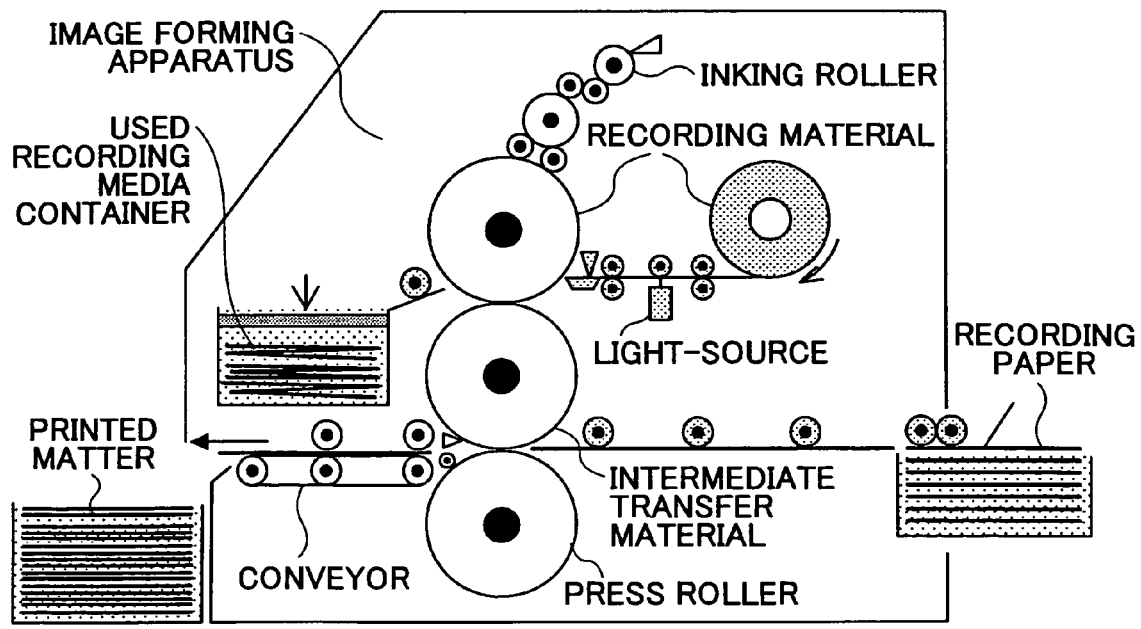

Moreover, the recording medium shown in FIG. 22 is made of the same material as the recording medium of FIG. 21, but image forming methods are different. An entire surface of the recording medium is processed so as to be in a state where ink adheres to the surface and, thereafter, a non-image area is selectively heated under non-existence of a contact member so as to form an image and develop the image by ink.

The above-mentioned material uses a fluorine resin such as a material containing fluorine acrylate for the record layer, and for the purpose of increasing a mechanical strength, an island structure may be formed with a urethane resin or filler may be mixed. Besides, in order to improve ink repellent property in a non-image portion, a silicone resin may be mixed. Additionally, in order to absorb a light and release a heat, carbon fine particles or a dye may mixed.

Figure 20A:
FIGS. 20A and 20B are illustrations of other examples of the recording medium.
Figure 20B:
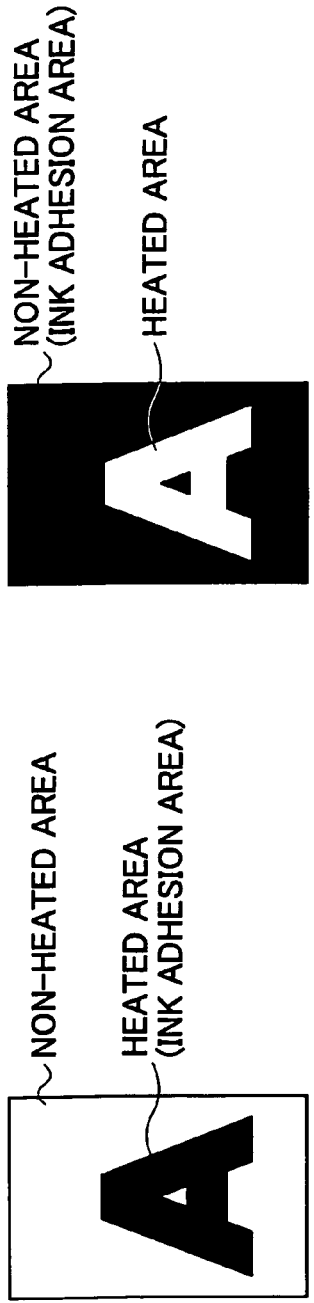

It should be noted that there are a recording medium having a heating area having a characteristic of adhering ink such as shown in FIG. 20A, or a recording medium having a non-heating area having a characteristic of adhering ink such as shown in FIG. 20B, each of which can be used. These recording media can be used as a printing plate for direct printing or offset printing.

Figure 24A:
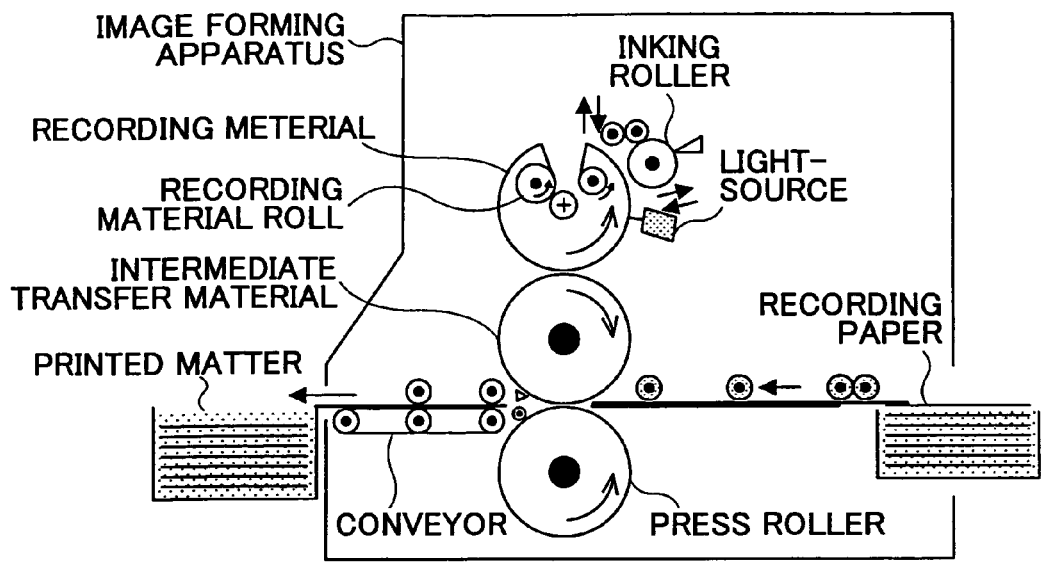
FIGS. 24A and 24B are illustrations of examples of a printing apparatus performing an image forming method according to the present invention.

Examples of an apparatus which prints using the above-mentioned printing plates are shown in FIGS. 23A and 23B, FIGS. 24A and 24B and FIG. 25. FIG. 23A shows an example of an apparatus, which forms an image on a belt-like recording medium and causes ink to adhere onto an image area so as to transfer the ink image onto a recording paper. FIG. 23B is an example of an offset printing machine which retains an image onto a drum while performing image formation of one print from a roll-like recording medium. FIG. 24A shows an example of an offset printing machine which performs image formation by retaining a recording medium roll within a plate body and after unreeling the recording medium by one print.

Figure 24B:
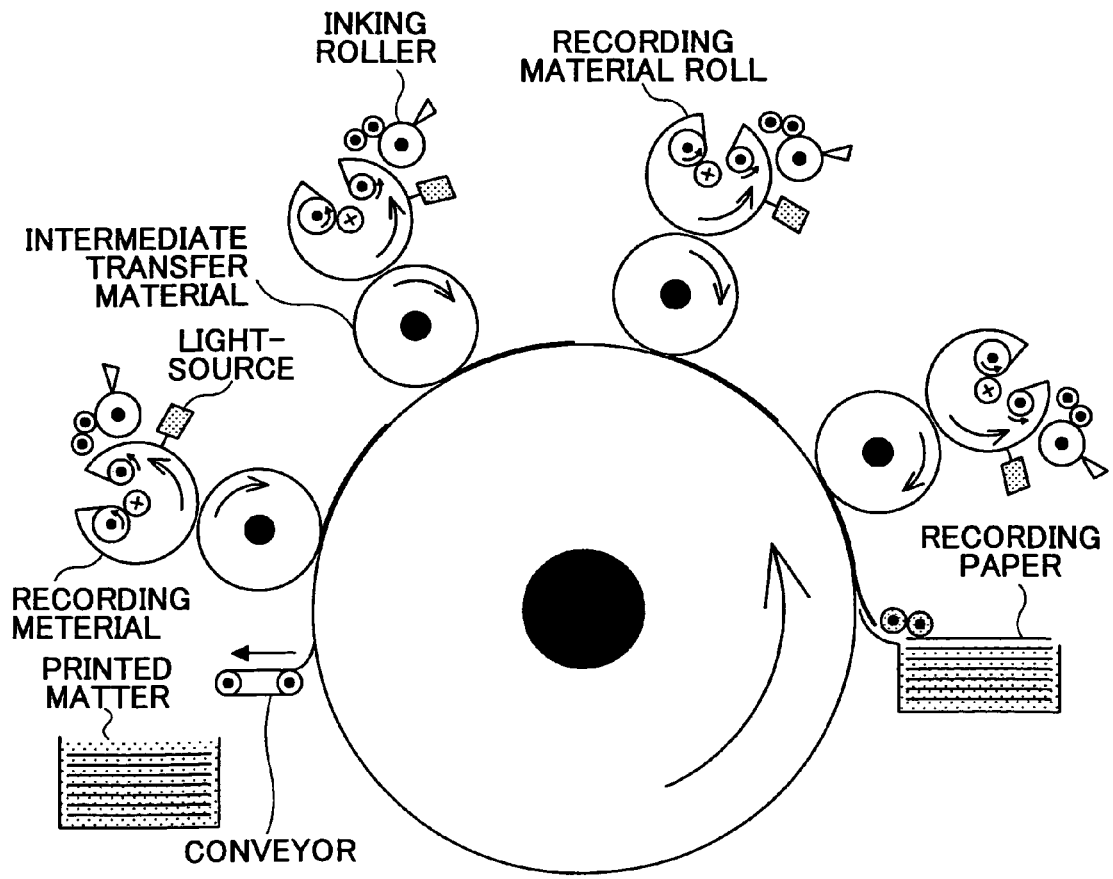
Figure 25:
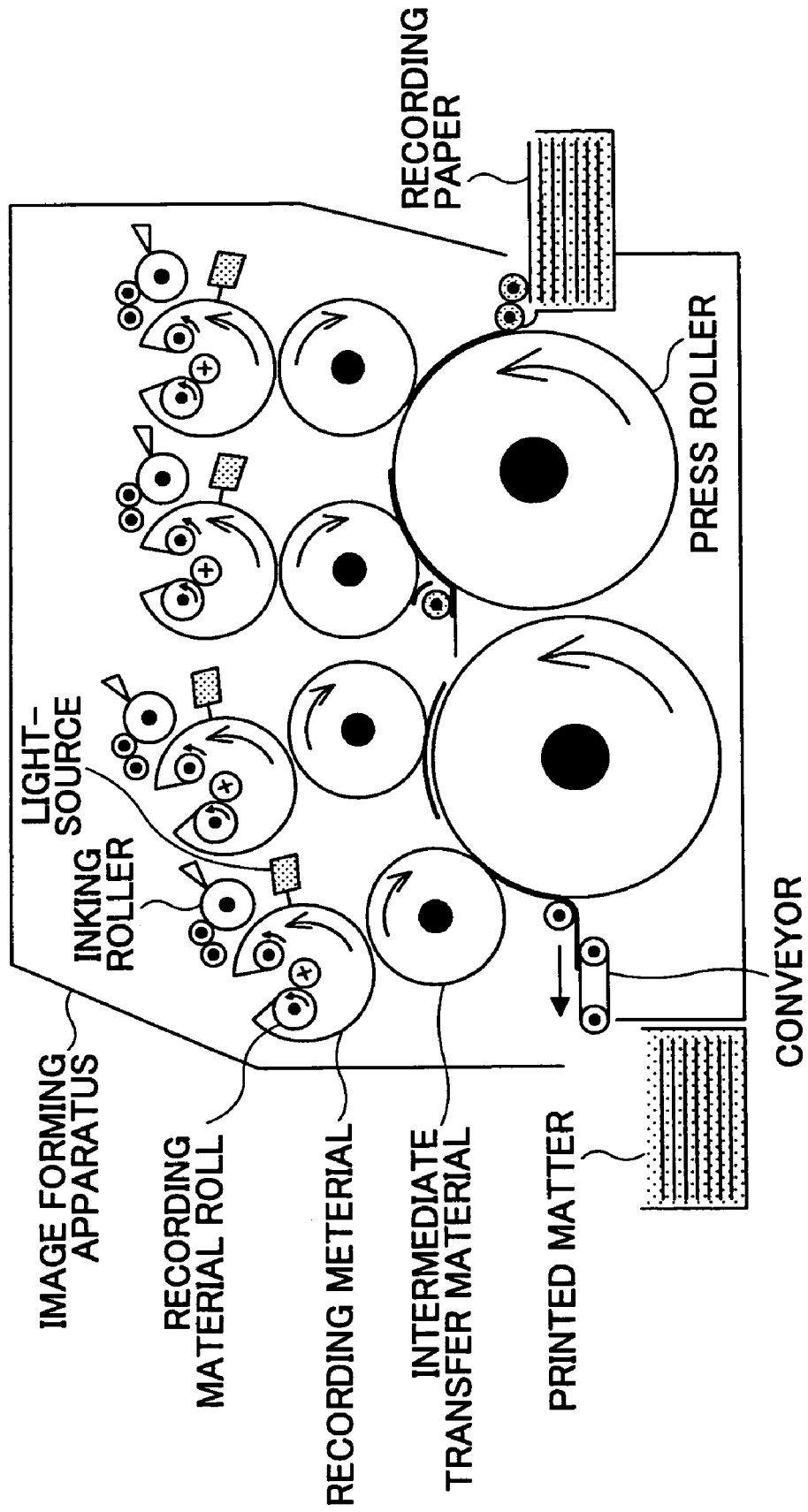
FIG. 25 is an illustration of an example of a printing apparatus performing an image forming method according to the present invention.

Moreover, FIG. 24B shows an example of an offset printing machine having a single platen. FIG. 25 shows an example of an offset printing machine having tow platens. In a case of a multi-color printing machine, in order to use a plurality of recording media, it is necessary to not only adjusting a leading position of an image for each color separately but also correcting a position of start writing so that positions of color images match with each other. As for the correcting method, a method of aligning a second color image and proceeding color images based on a first color image on the recording medium is capable of reducing an adjusting time since there is no need to adjust for all color images.

A description will be given below of specific examples of image formation according to the present invention.

(1) Image formation was performed on the three kinds of recording media shown in FIG. 26 by using an LD of CW 150 mW output and 830 nm wavelength and an LD of CW 120 mW output and 784 nm wavelength with 2400 dip and 2540 dpi, and an amount of misalignment was measured for each connecting portion. A result of the measurement is shown in FIG. 27A (light-source pitch 5.588 mm) and FIG. 27B (light-source pitch 5.6 mm).

Then, correction of the amount of misalignment was performed by various combinations using the methods shown in FIG. 14 to FIG. 16, and high quality images having less visible connecting portion were formed. It should be noted that a voice coil motor was mounted as an actuator on a head moving stage, and the stage had a control performance of a resolution of movement of 0.02 µm/pulse by an optical linear encoder. The drum diameter was 210 mm and rotating speed was 30 and 60 rpm. Other conditions were as shown in FIG. 26.

(2) A head of an LD of CW 150 mW output and 830 nm wavelength and an LD of CW 120 mW output and 784 nm, and three kinds of recording media shown in FIG. 26 were used. A head adjustment was performed by aerial adhesion of a collimator lens by an UV adhesive, and beam irradiated positions at that time was obtained by PSD sensors (FIG. 27C (light-source pitch 5.588 mm), FIG. 27D (light-source pitch 5.6 mm)).

Then, correction of the amount of misalignment was performed by various combinations using the methods shown in FIG. 14 to FIG. 16, and high quality images having less visible connecting portion were formed. It should be noted that a voice coil motor was mounted as an actuator on a head moving stage, and the stage had a control performance of a resolution of movement of 0.02 µm/pulse by an optical linear encoder. The drum diameter was 210 mm and rotating speed was 30 and 60 rpm. Other conditions were as shown in FIG. 26.

(3) A head of an LD of CW 150 mW output and 830 nm wavelength and an LD of CW 120 mW output and 784 nm, and three kinds of recording media shown in FIG. 26 were used. Irradiated position information of writing units was obtained by PSD sensors located at positions facing the light sources of the image writing apparatus (FIG. 27E (light-source pitch 5.588 mm), FIG. 27F (light-source pitch 5.6 mm)).

Then, correction of the amount of misalignment was performed using various combinations using the methods shown in FIGS. 2C through 2E and methods shown in FIG. 14 to FIG. 16, and high quality images having less visible connecting portion were formed. It should be noted that a voice coil motor was mounted as an actuator on a head moving stage, and the stage had a control performance of a resolution of movement of 0.02 µm/pulse by an optical linear encoder. The drum diameter was 210 mm and rotating speed was 30 and 60 rpm. Other conditions were as shown in FIG. 26. It should be noted that materials indicated in the table of FIG. 26 are main components, but they are not always materials of a large content.

As mentioned above, according to the present embodiment, a correction of the connecting part in the images can be corrected irrespective of a fluctuation in misalignment in the connecting portion, which may be caused by errors in a mechanical system, an optical system or an assembly process. Thus, image formation of a high quality image having less visible connecting portion can be performed. Additionally, even if there is a large fluctuation in an amount of misalignment in the image connecting portion, such misalignment can be corrected.

According to the above-mentioned embodiment, the data of an amount of image misalignment can be surely acquired. Additionally, a head exchange can be easy and effort of measuring an amount of image misalignment can be eliminated. Further, it becomes possible to perform a correction without giving influence to a formed image, that is, without generating irregularity in the formed image.

Additionally, according to the above-mentioned embodiment, if an amount of misalignment of adjacent writing units is greater than a line width, a connection portion in the image can be corrected. Since image formation can be ended if all writing units have a predetermined line interval, a correction of misalignment can be sequentially performed at the end of the image formation, which enables attempting a reduction in the writing time.

Additionally, according to the above-mentioned embodiment, since all writing units are driven at the same time, a failure in the wiring units can be checked, and it is possible to reduce the writing time.

Further, according the above-mentioned embodiment, the image forming apparatus is capable of perform image formation on a printing plate and/or a mask film. The image forming apparatus can be designed to correspond with POD.

It should be noted that the image forming method according to the above-mentioned embodiment can be described in a program executable by a computer. Such a program is stored in a computer readable recording medium such a flexible disk, a CD-ROM or the like so that a computer reads and executes the program stored in the recording medium. A structure of such a computer is explained later in the third embodiment.

Second Embodiment

A description will now be given, with reference to FIGS. 28 through 31, of a second embodiment of the present invention.

In an image forming method according to the present embodiment, an image is formed based on divided image data which is obtained by dividing original image data into pieces of image data corresponding to a plurality of lines. The divided images are written on a surface of a recording medium in accordance with the divided image data so as to form an image while a shift of each line in the divided image data is arbitrarily varied.

Figure 28:
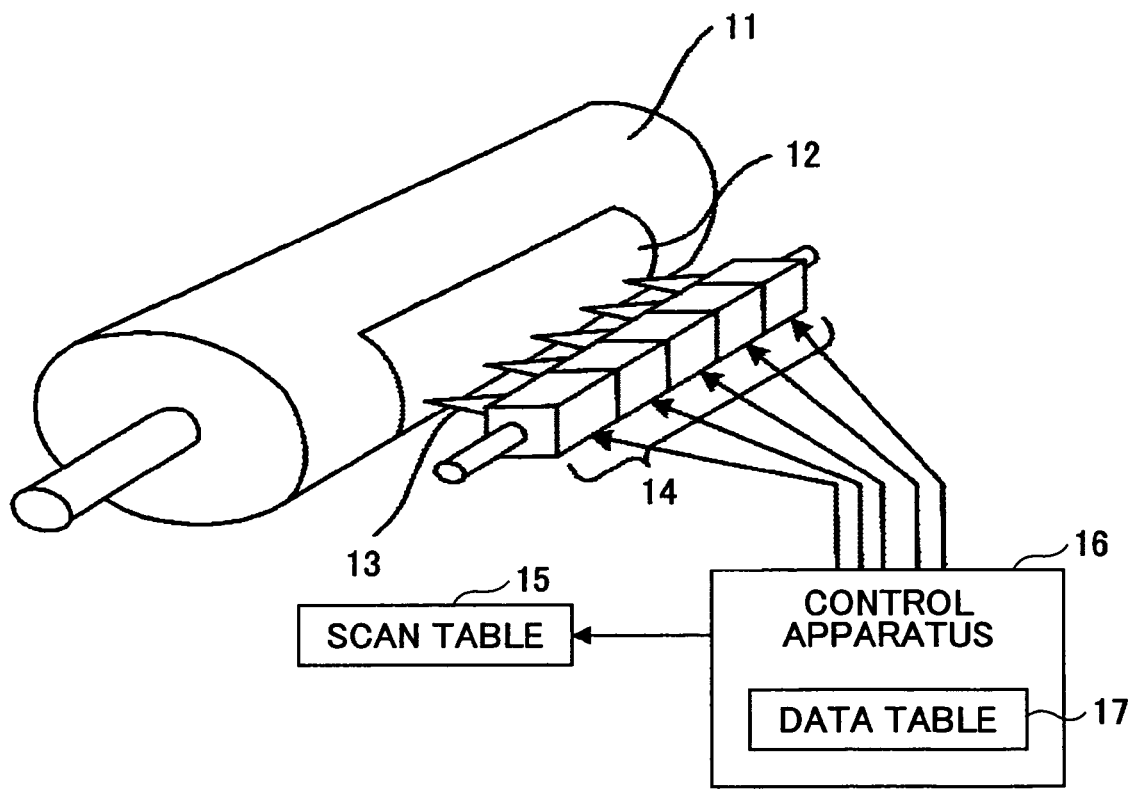
FIG. 28 is an illustrative perspective view of an image forming part of an image forming apparatus according to a second embodiment of the present invention.

FIG. 28 is an illustration of a structure of an image forming apparatus according to the second embodiment of the present invention. In FIG. 28, an image forming part comprises a drum 11 rotatable by a power source (not shown in the figure)

and a plurality of energy irradiation devices 14 which irradiate energy fluxes onto a printing plate attached to an outer surface or an inner surface of the drum 11.

A drum diameter of the drum 11 and a length of the drum 11 in a longitudinal direction are determined so that the printing plate 12, on which an image is recorded, of a maximum size can be wound on the drum 11. A scan table 15 movable along a line parallel to a rotational axis of the drum 11 are moved by a rotation of a ball screw, a linear motor or the like. A rotating speed of the drum 11 and an amount of movement of the scan table 15 are controlled by a control device 16. The rotating speed of the drum 11 can be grasped using a stepping motor or a servomotor. Additionally, an amount of movement of the drum 11 can also be grasped by a servo control of the stepping motor or the linear motor, and a detection sensor of an amount of movement necessary for the servo mechanism may be used if needed.

Further, the energy irradiation device 14 has energy irradiation sources (not shown in the figure) such as a semiconductor laser, an LED or a solid or gas laser, which emits a higher energy than the semiconductor laser. That is, a laser, an electric heating element, etc., may be used as the energy source and the energy may be transmitted by an optical fiber. The irradiated energy flux 13 is converged and forms an energy focal point on the surface of the printing plate 12. It should be noted that if it is a laser light, a lens is used to converge the laser light. If it is a heat-source, energy irradiation can be achieved by contacting the heat-source with the surface of the printing plate. Further, if a silver salt photosensitive material is used for the printing plate 12, a light is used for the energy-source. The wavelength of the light-source is selected in accordance with a reaction wavelength range of the silver salt photosensitive material. Additionally, if it is used for printing, it can be applied to fabrication of a printing plate film or an image may be formed directly on the printing plate.

An amount of energy emitted by each of the energy irradiation devices 14 and time period of the emission is controlled by the control device 16. The energy irradiation devices 14 are installed on the scan table 15. Thus, the energy fluxes 13 can be scanned in the axial direction of the drum 11. Additionally, the printing plate 12 can be scanned in a rotating direction of the drum 11 due to rotation of the drum 11. Further, the energy irradiation devices 14 are installed on the scanning table 15.

Moreover, a sensor for determining a location of a reference of an angular position of the drum 11 is installed. Thus, a signal is sent to the control device when the drum 11 rotates to the angular position at which the sensor is installed. The sensor may be achieved by a light-shielding plate (not shown in the figure) provided on a circumferential surface of the drum 11 and light-transmission sensor provided on a side of the drum 11 so that a light to the light-transmission sensor is blocked by the light-shielding plate when the drum 11 is at the above-mentioned angular position, which is set as a drum rotation original point. The drum rotation original point is related to a recording start position in a vertical direction of the printing plate 12.

The scan table 15 is provided with a sensor (not shown in the figure) which indicates a left end and right end of the movable range. In addition, a sensor (not shown in the figure) which indicates a scan table original point within the movable range is provided. Signals of these sensors are sent to the control device 16. These sensors can be achieved by a light-transmission sensors or the like.

Moreover, the scan table original point is related to the recording start position on the left and right of the printing plate 12. When recording image original data on the printing plate 12, the scan table 15 is moved first to the scan table original point, and, thereafter, the drum 11 is rotated. Then, a signal of the original point of the drum 11 is sent to the control device 16 for each complete rotation of the drum 11.

A concentration signal of the image original data is sent to the energy irradiation devices 14 by referring to the time of receiving the drum rotation original point signal. An amount of energy emitted by each of the energy irradiation devices 14 is related to the concentration level of each pixel of the image original data. The image original data corresponding to one vertical line is sent to one of the energy irradiating devices 14 while the drum 11 makes a complete rotation. The image original data corresponding to another vertical line at a distance corresponding to the interval of the plurality of energy focal points is sent to each of the energy irradiation devices 14. After the image data corresponding to one line is sent, the scan table 15 is moved and wait for a next drum rotation original point signal. Then, the image original data corresponding to the next columns is sent to the energy irradiation devices 14. The above-mentioned operation is repeated for each complete rotation of the drum 11. Thus, the scan table 15 moves to a position where one of the energy irradiation device 14 reaches an area where an image has been recorded by the adjacent scanning device 14, and the image recording is ended.

Data regarding an amount of movement of the scan table 15 is stored in a data table provided in the control device 16. The data table 17 previously stores data regarding an amount of movement of the scan table 15 related to a number of column of the image original data in the dram rotating direction. Before sending the image original data corresponding to one column, the amount of movement of the scan table 15 corresponding to the column of the image data is read as to move the scan table 15 by the amount of movement read from the data table 17.

The data table 17 may store the same amount of movement or may store an arbitrary amount of movement fro each column. Normally, an amount of shift corresponding to one pixel determined by a pixel density of an image to be formed. For example, if the image density is 1200 dpi, data causing the scan table to move $1/1200$ inch is stored. If the all of values stored in the data table 17 are the same, the scan table 15 may be moved by an amount of movement set as a specified value without storing the values in the data table 17.

Figure 29:
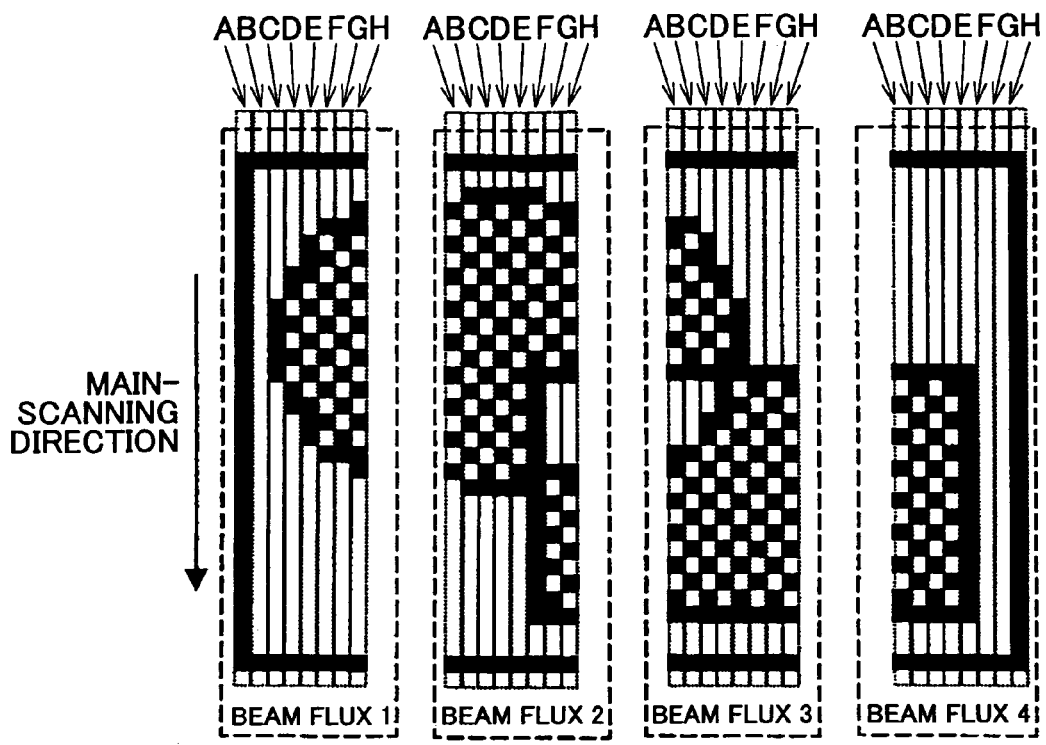
FIG. 29 is an illustration showing energy fluxes of energy irradiation devices sharing image formation.

Here, suppose that there is image original data shown in FIG. 3. When forming an image based on the image original data by sharing by, for example, four energy irradiation devices, the image is formed by the energy flux of each of the energy irradiation apparatuses as shown in FIG. 29. In each energy flux, the alphabets A through H represent columns and orders of the image to be formed. For example, the columns A in the beam fluxes are formed simultaneously. Additionally, it can be regarded as a value representing an amount of feed of the scan table. Since the energy irradiation-devices are on the same scan table, the columns simultaneously formed in each assigned area have the same width.

Figure 30:
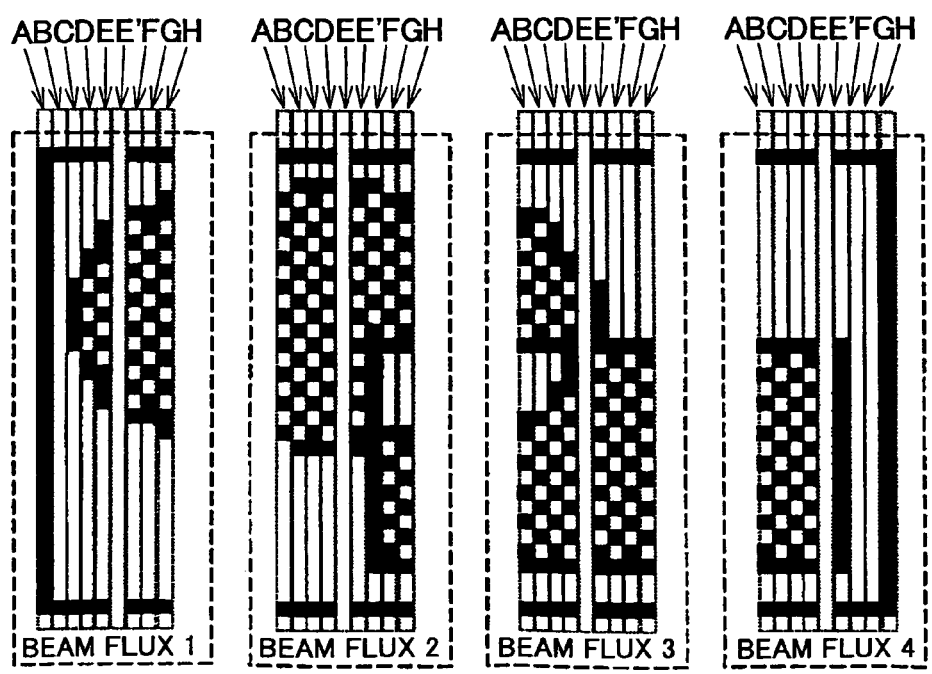
FIG. 30 is an illustration showing the energy fluxes when blank image data is inserted.

Furthermore, supposing that only intervals between E column and each of D and F columns in the beam flux 1 are to be changed. Normally, if the E column of the beam flux 1 is changed, intervals relating to E column in other beam fluxes are also changed. In order to avoid such a change, image formation in E columns is not performed except for the E column of the beam flux 1. For example, blank image data is inserted as shown in FIG. 30. However, if F column is formed immediately after E column, the columns after column E in the beam flux 1 are shifted from the columns after column E in other beam fluxes by the width of the blank image data. In order to eliminate such a problem, a blank column E' is inserted after E column in the beam flux 1 and the rest of the columns are formed after the E' column.

If it is supposed that the alphabets A through H represent an amount of feed of the scan table and an interval of the columns corresponding to a feed amount a are equal to each other, it can be expressed as A=B=C=D=E=F=G=H=α. Here, when changing a position of forming only the E column of the beam flux 1, for example, if an interval between the E column and the D column is α/2, it is set as E=α/2 and E'=(1+½)α so as to adjust positions of other columns after the E column. Thus, the intervals of the columns A, B, C, D, F, G and H are equal to α (A=B=C=D=F=G=H=α). Thereby, only the image of E column in the beam flux 1 is adjusted and can be formed at an arbitrary position. As mentioned above, a fine adjustment of formed image can be achieved by providing the data table relating to the image original data.

Figure 31:
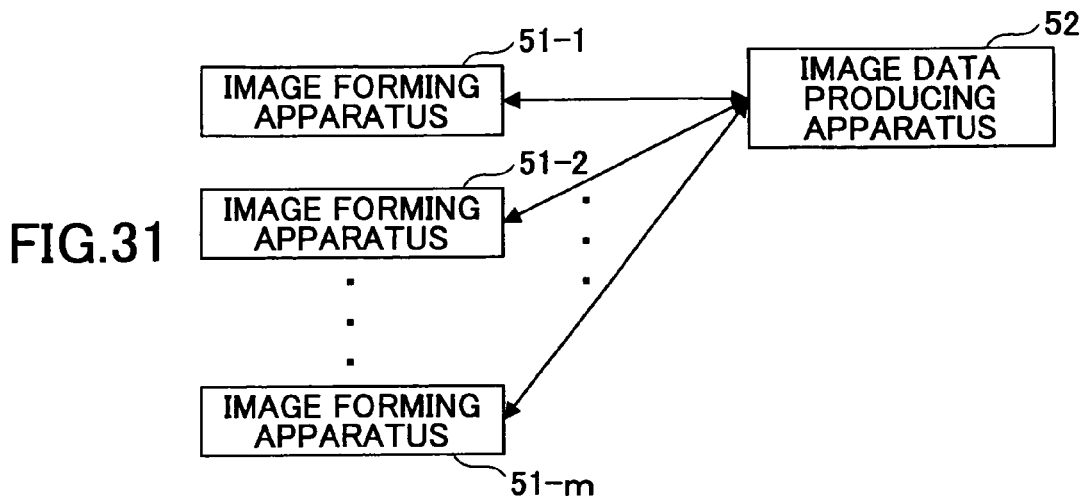
FIG. 31 is a block diagram of an image forming system according to the second embodiment of the present embodiment.

A description will now be given of a case where a plurality of image forming apparatus is connected to an image data producing apparatus. FIG. 31 is an illustration of a system in which a plurality of image forming apparatuses 51-1, 51-2, ..., 51-m (m is a positive integer) are connected to and controlled by an image data producing apparatus 52. Each of the image forming apparatuses 51-1, 51-2 ..., 51-m forms an image by using a plurality of energy irradiation devices and a scan table which is moved according to the above-mentioned data table. The image data producing apparatus 52 produces data table and image data from the original image such as shown in FIG. 3. As shown in FIG. 31, the image data producing apparatus 52 is connected to each of the plurality of image forming apparatuses 51-1, 51-2 ..., 51-m through a communication line. Each of the plurality of image forming apparatuses 51-1, 51-2 ..., 51-m has a unique identification number and has information regarding misalignment of energy irradiation devices incorporated therein.

The system shown in FIG. 31 operates as follows each of the image forming apparatuses 51-1 through 51-m sends the identification number of it own and notifies the mage data producing apparatus 52 of a fact that a connection therebetween is established. The image data producing apparatus 52 requests the image forming apparatuses 51-1 through 51-m, which are identified by the identification number, to send misalignment information. Then, the image forming apparatuses 51-1 through 51-m send existing misalignment information to the image data producing apparatus 52. When image original data and one of the image forming apparatuses to use to form an image are designated, the image data producing apparatus 52 produces image data and data table suitable for the designated one of the image forming apparatuses, and send the produced image data and data table to the designated one of the image forming apparatuses. Then, the designated one of the image forming apparatuses 51-1 through 51-m starts image formation and performs a shift in a sub-scanning direction for each main-scanning column of the image data by referring to the data table. After completion of the image formation, the image forming apparatus notifies the image data producing apparatus 52 of the completion of image formation. It should be noted that image forming apparatuses 51-1 through 51-m and the image data producing apparatus 52 may be mounted in the same apparatus. By separating the image forming apparatuses and the image data producing apparatus, formation of image on a printing plate and production of image original data can be separated.

It should be noted that since a fine adjustment of image forming position can be made using a plurality of energy irradiation devices as mentioned above, an image forming apparatus, which can produce a printing plate at a high speed, can be provided. Additionally, use of a silver salt photosensitive material having excellent sensitivity to a light permits image formation with a weaker light, which allows further high-speed image formation.

As explained above, in the image forming method according to the above-mentioned embodiment, a single image is formed by writing divided images on a surface of a recording medium based on divided image data obtained by dividing image data of the single image into a plurality of pieces of image data corresponding to a plurality of lines, respectively, so as to arbitrarily vary an amount of line feed of each line in each of the pieces of image data. Accordingly, a line density of the formed image in a sub-scanning direction can be minutely adjusted by arbitrarily varying the amount of line feed.

Moreover, management of data regarding an amount of shift becomes easy by controlling the line shift amount according to the data table storing data regarding an amount of line shift, which is determined based on a line density in original image data and data regarding a head position error generated when attaching a write head.

Furthermore, when the amount of shift in an arbitrary area differs from the amount of shift in other areas, a drawing position of only a specific beam flux can be shifted by inserting a blank line so that image formation is not performed in other areas.

Moreover, by correcting an amount of shift of a next line proceeding to the position where the blank line was inserted, a drawing position of a specific line can be shifted.

Furthermore, the image forming apparatus can prepare for a shift in a sub-scanning direction by transmitting the data table to the image forming apparatus before sending the divided image data, thereby permitting the image formation being performed smoothly.

Moreover, by providing the data table to an image data producing apparatus, which produces the divided image data, or the image forming apparatus, the image formation and the production of the image data can be separated from each other, and, thus, centralization or decentralization of functions can be achieve, which results in an increase in a freedom of a system structure as a whole image forming system.

Furthermore, each of a plurality of image forming apparatuses can be specified by identifying each image forming apparatus and relating each image forming apparatus to one of a plurality of data tables based on the result of identification. Additionally, by specifying one of the image forming apparatuses, the data table which matches the one of the image forming apparatuses can be determined.

Moreover, by holding the head position error data in the image forming apparatus, and producing the data table by an external image data producing apparatus based on the head position error data, the image data producing apparatus is not required to hold the specific information and can acquire the specific data by a request if needed, thereby allowing separation from the image forming apparatus, which results in an increase in versatility.

Furthermore, the image forming apparatus according to the above-mentioned embodiment comprises: a plurality of writing means for forming a single image on a surface of a recording medium by writing divided images based on divided image data obtained by dividing single original image data into a plurality of areas; image data producing means for producing the divided image data and sending the divided image data to the writing units and storing the divided image data; and line shift amount changing means for arbitrarily varying the line shift amount of each line in the divided image data. Accordingly, a fine adjustment of the image forming position can be carried out, which can provide an image forming apparatus capable of producing a printing plate at high speed.

It should be noted that the image forming method according to the above-mentioned embodiment can be described in a program executable by a computer. Such a program is stored in a computer readable recording medium such a flexible disk, a CD-ROM or the like so that a computer reads and executes the program stored in the recording medium. A structure of such a computer is explained later in the third embodiment.

Third Embodiment

A description will now be given, with reference to FIGS. 32 through 41, of a third embodiment of the present invention.

An image forming or recording apparatus performing an image processing method according to the third embodiment of the present invention has the same structure as the image forming apparatus according to the second embodiment as shown in FIG. 28, and descriptions thereof will be omitted.

A description will be given of a process of adding image recording apparatus information to image data to be sent to the image recording or forming apparatus using the image processing method according to the present embodiment. Hereinafter, the image recording or forming apparatus may be referred to as an image recording apparatus.

Figure 32A:
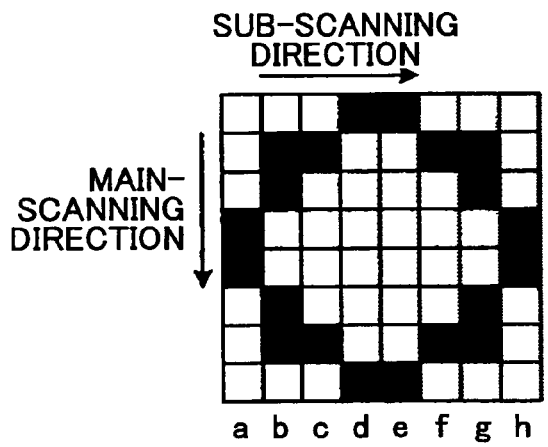
FIG. 32A is an illustration of a raster image data.

The image recording apparatus changes a scan position when recording an image in accordance with scan position information. Here, the scan position information contains information representing irregularity in a formed image due to an error in the can positions. Additionally, the raster image data expresses an image ass an arrangement of dots, and a plane image can be treated as two-dimensional arrangement. For Example, FIG. 32A shows a monochrome binary image of 8×8 dots.

Figure 32B:
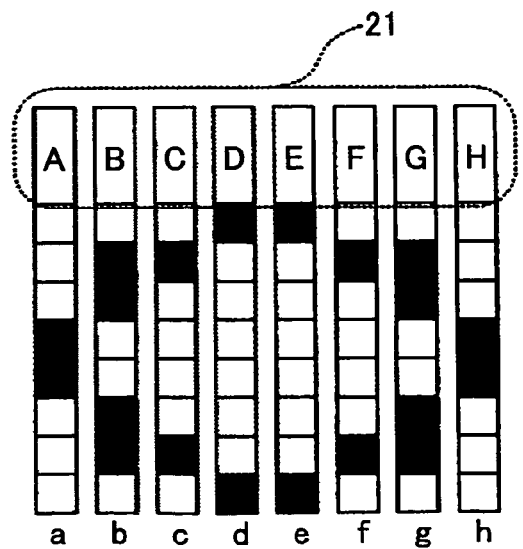
FIG. 32B is an illustration of the raster image data with scan position information.

If an arbitrary image recording apparatus records the image of FIG. 2A by setting a longitudinal direction of the image as a main-scanning direction, the apparatus records the image by a column, b column, c column, ... , h column in that order in the main-scanning direction. At this time, data of an output data format is set as shown in FIG. 32B. It should be noted that the alphabets A, B, C, ... , H represent scan position information 21. That is, the alphabet A represents information regarding a scan position at which the image of a column is written by the image recording apparatus. Similarly, the alphabets B, C, ... , H represent information regarding scan positions at which the image of b, c, ... , h column are written by the image recording apparatus, respectively. Data of an output data format is arranged as, for example, the scan position information A, the image column a, the scan position information B, the image column b, the scan position information C, the image column c, ... , the scan position information H, and the image column h.

The image columns are arranged in an order of scanning by the image recording apparatus, and the scan position information A is supplied to the image recording apparatus earlier than the image column a by being arranged in front of the image column a. Thereby, the image recording apparatus obtains information to acquire a scan position before recording an image column.

It should be noted that the order of the data is not limited to the above-mentioned order, and they may be arranged in an order of scan position information A, B, C, ... , H, image column a, b, c, ... , h. Additionally, The scan position information A, B, C, ... , H may be separated as separate information from the image columns a, b, c, ... , h.

A description will be given below of the scan position information in a case shown in FIG. 3A, that is, a case where the data of the image of the b column b is output forward in the main-scanning direction by 1 dot and the data of the image of the e column is output behind by in the main-scanning direction by 1 dot. This may happen due to fluctuation in the main-scanning direction when recording an image. At this time, the scan position information A, B, C, ... , H are set as values of 0, 1, 0, −1, 0, 0, 0 as a main-scanning start positions. These values are loaded to raster image data as scan position information 31 so as to produce output data such as shown in FIG. 33C. Additionally, correction data (indicated by hatched portions in the figure) 32 shown in FIG. 32D may be provided to the image data in accordance with the scan position information 31. The correction data 32 is added so that the drawing start positions of the original image columns are aligned by setting the rearmost column in the main-scanning direction as a reference. It should be noted that the correction data 32 is preferably set as data according which not drawing is performed.

Figure 34A:
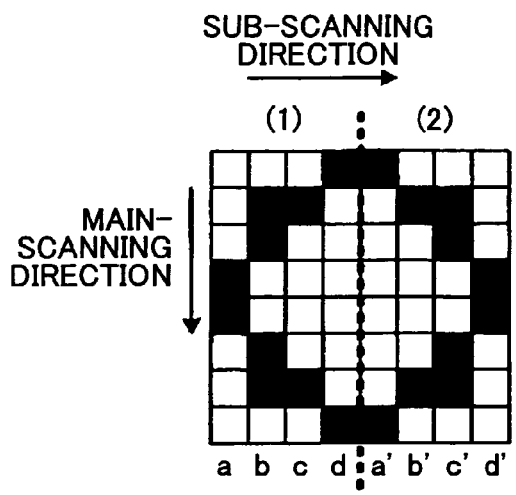
FIGS. 34A through 34D are illustrations for explaining another example of the scan position information.
Figure 34B:
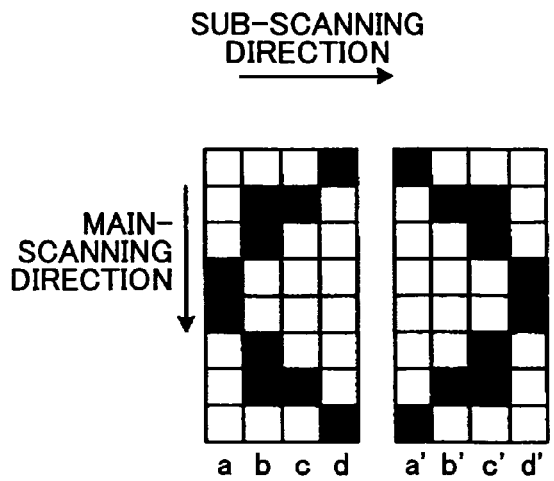

FIGS. 34A through 34D are illustrations showing another example of the scan position information. In this example, a process is performed by two image recording units (1) and (2) of the image forming apparatus. The image recording unit (1) records a, b, c, d columns of the image on the left side and image recording unit (2) records a', b', c', d' columns of the image on the left side, as shown in FIG. 34A. The a column and the a' column are recorded simultaneously, the b column and the b' column are recorded simultaneously, the c column and the c' column are recorded simultaneously, and the d column and the d' column are recorded simultaneously. The recording area (1) and the recording area (2) are connected in the sub-scanning direction. It is supposed that an image recording shown in FIG. 34B is obtained by the above-mentioned apparatus.

Figure 34C:
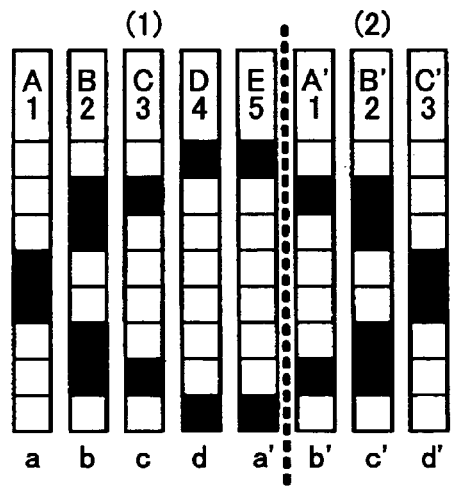
Figure 34D:
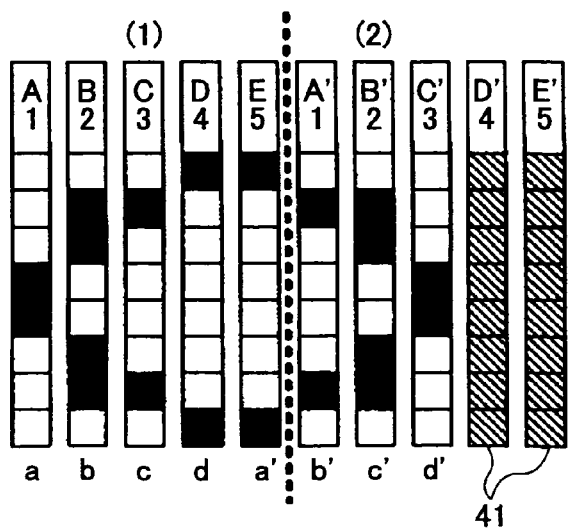

When forming a single image using a plurality of sets of image recording units, misalignment may occur in the image between the image recording units. FIG. 34B shows a case where a gap corresponding to 1 dot is formed between the recording area (1) and the recording area (2). The can position information at this time is set as shown in FIG. 34C. The column where the gap is formed is the fifth column in the sub-scanning direction. Thus, a column E is provided to the column data of the image recording unit (1). The scan position information is provided for five columns A, B, C, D, and E so that recording is made at the respective scan positions in the sub-scanning direction. A corresponds to the first scanning, B corresponds to the second scanning, and so on. The image data of E column is originally a' which is the first scanning of the image recording unit (2).

On the other hand, since one image data column of the image recording unit (2) was transferred to the recording area (1), the recording area (2) contains only b' c' and d'. The scan position information A', B' and C' represent the first, second and third scanning, respectively, in the sub-scanning direction. In this case, a number of columns of the image recording unit (1) is 5 and a number of columns of the image recording unit (2) is 3, and, thereby, the data structure differs from each image recording apparatus. In order to avoid such as problem, two correction data columns 41 are added to the image recording unit (2). The correction data columns 41 are data which does not draw an image. Thus, D' and E' are added as scan position information and data representing the forth scanning and the fifth scanning in the sub-scanning direction is recorded. Thereby, both the image recording units (1) and (2) can operate with the same data structure.

Figure 35A:
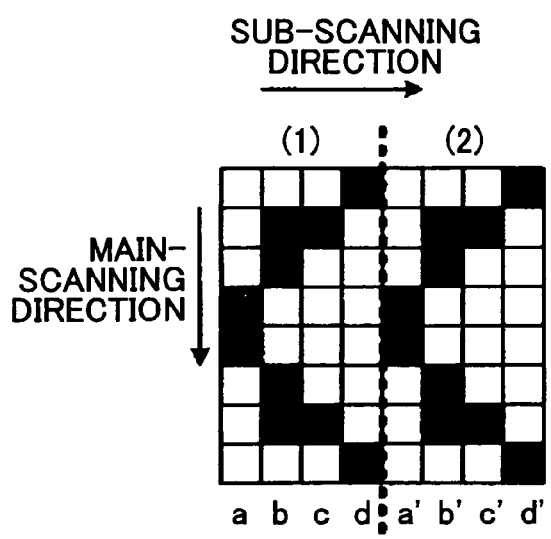
FIGS. 35A through 35E are illustrations for explaining another example of the scan position information.
Figure 35B:
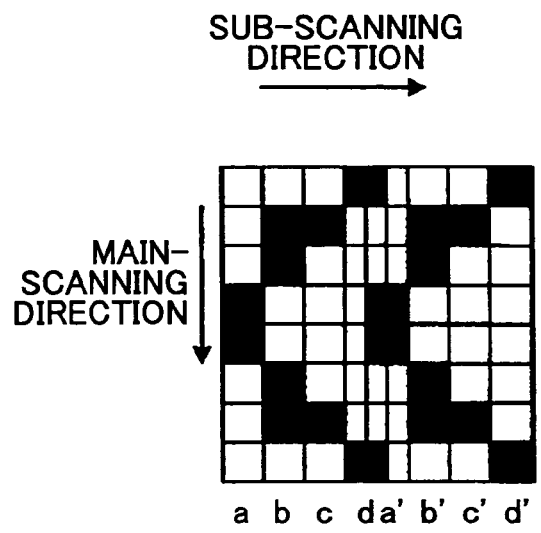
Figure 35C:
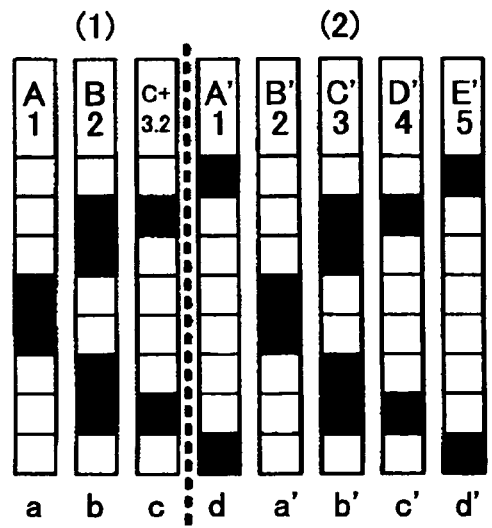
Figure 35D:
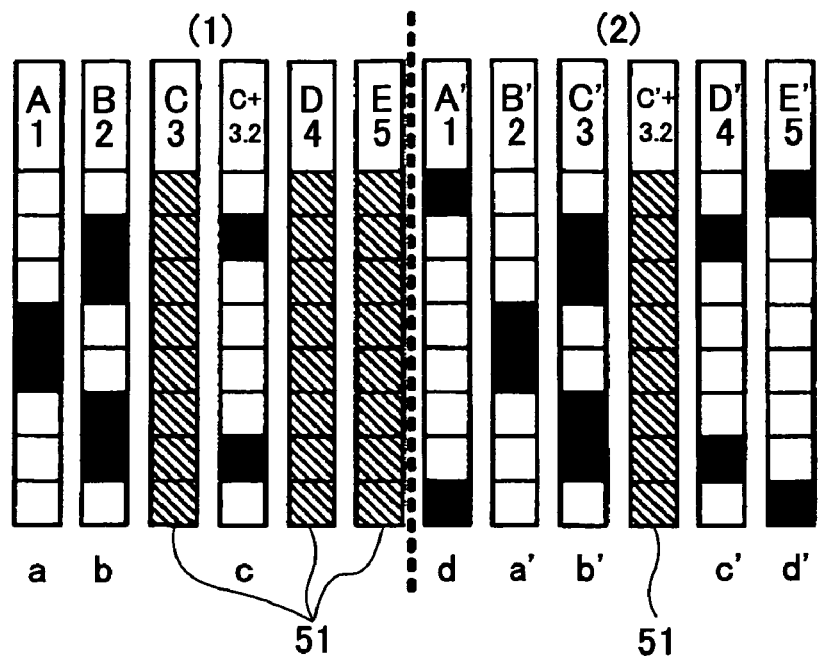

FIGS. 35A through 35E are illustrations showing another example of the scan position information. It is supposed that an image shown in FIG. 35B is obtained by outputting image data shown in FIG. 35A by an image recording apparatus. In this example, the d column of the image recording apparatus (1) overlaps with the column a' of the image recording unit (2) by about a half portion. The scan position information in this condition is shown in FIGS. 35C and 35D.

First, in FIG. 35C, the overlapping portion is recorded by the image forming unit (2), but not recorded by the image recording unit (1). Then, the sub-scanning position of the c column of the image recording unit (1) is set to 3.2 and is represented by the scan position information C+. This means that the c column is shifted from the position of the third scanning by 0.2.

The image recording units (1) and (2) of the image recording apparatus of this example are supposed to move integrally in the sub-scanning direction in this example. Thus, the c column corresponding to the third scanning of the recording area (1) and the b' column corresponding to the third scanning of the recording area (2) are recorded simultaneously. In order to cause the image recording units (1) and (2) to operate with the same data structure, a correction data column 51 is added as shown in FIG. 5D. That is, there exists the c' column at the scan position 3 in the recording area (2) but there is no scan position 3 in the recording area (1). Thus, the correction data columns corresponding to the scan positions 4 and 5 and scan position information D and scan position information E are added.

On the contrary, there exists the scan position information C+ of the scan position 3.2 in the recording area (1) but there is no scan position information corresponding to the scan position 3.2 in the recording area (2). Thus, a correction data column corresponding to the scan position 3.2 and scan position information C'+ are added. By performing such an operation, the image data is changed to that shown in FIG. 35D. Thus, the output data of FIG. 35D is output by an image forming apparatus, which can change a sub-scanning position of the recording unit based on the scanning position information. For example, the sub-scanning position 3.2 of the scan position information is read, and the sub-scanning position is shifted to the position corresponding to 3.2 scanning when recording the image data of the c column.

Figure 35E:
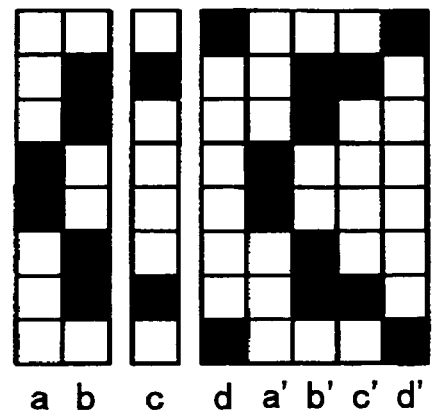

If an image is output using the above-mentioned apparatus, a recording result such as shown in FIG. 35E is obtained from the output data of FIG. 35D. That is, the c column is recorded at a position in the middle of a gap larger than 1 dot between the b column and the d column so that a recording position error of the image recording units is less visible.

Figure 36:
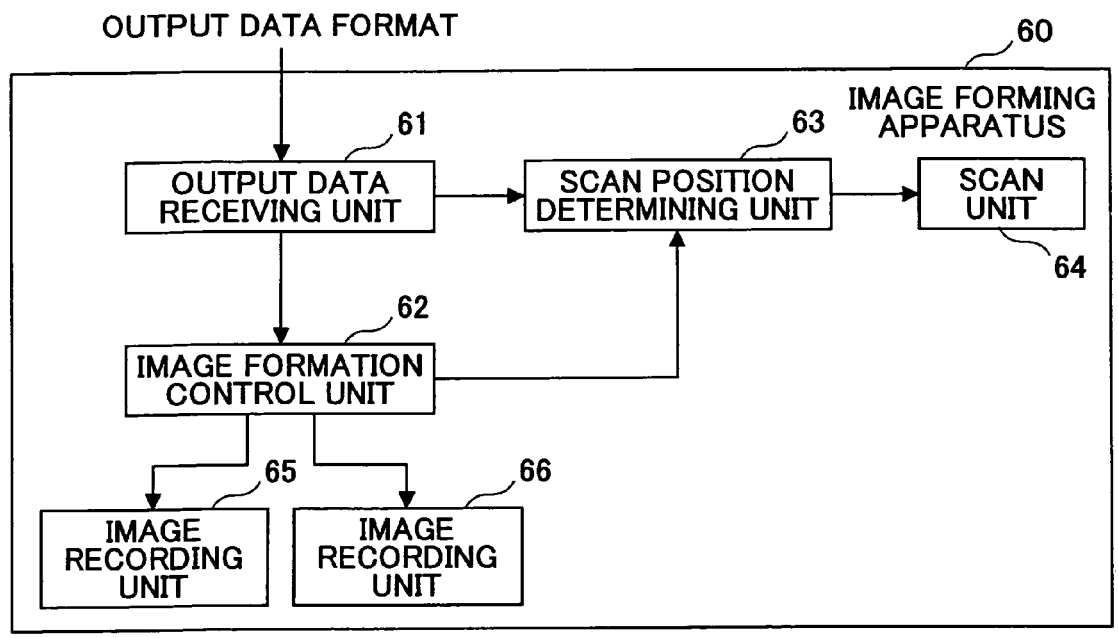
FIG. 36 is a block diagram of an image forming apparatus to which an image processing method according to the present invention is applicable.

FIG. 36 is a block diagram of an image forming apparatus to which the image processing method according to the present embodiment is applied. The image forming apparatus 60 shown in FIG. 36 comprises an output data receiving unit 61, an image formation control unit 62, a scan position determination unit 63, a scan unit 64 and image recording units 64 and 65. The output data receiving unit 61 receives output image data format such as shown in FIG. 35A, and discriminates scan position information and image data of the output image data format. The image formation control unit 62 controls operations of the scan unit 64, the image recording units 65 and 66 for image formation, and acquire synchronization between a scan position and image data. The scan position determination unit 63 determines a present scan position according information from scan position information and image formation control unit 62, and sends an instruction of the determined scan position to the scan unit 64.

Figure 37:
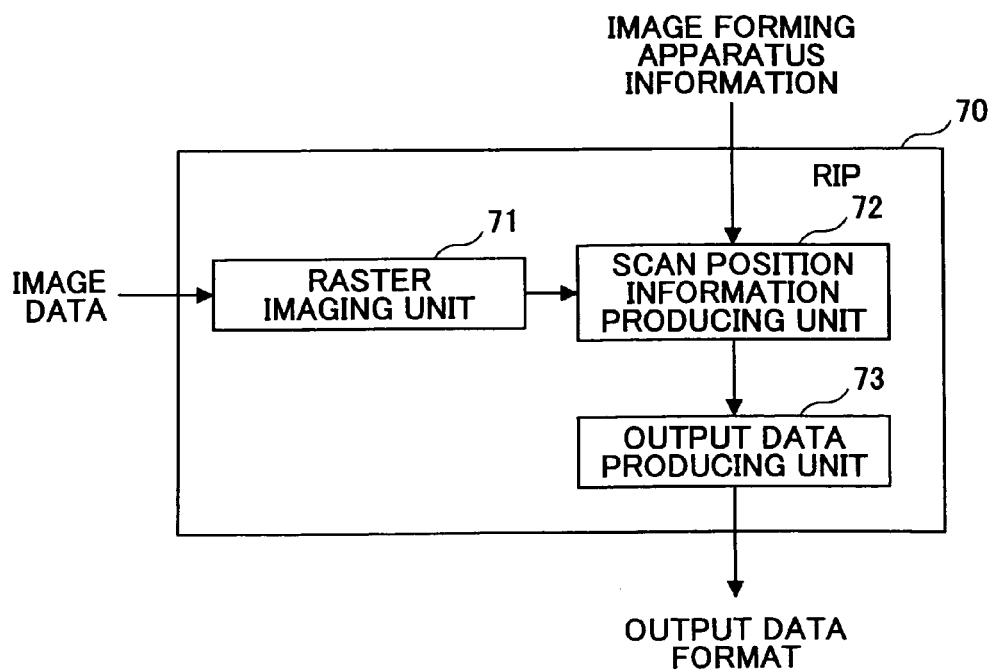
FIG. 37 is a block diagram of a raster image processor (RIP) to which the image processing method according to the present invention is applicable.

FIG. 37 is a block diagram showing a raster image processor to which the image processing method according to the present embodiment is applicable. The raster image processor (hereinafter, abbreviated as RIP) 70 applies, if necessary, a color separation, a monochrome conversion and an area modulation of concentration gradation to an image expressed by a vector form or an image expressed by a bit map form. The RIP 70 generates a bit map image by a raster imaging unit 71, and changes the bit map image into a form suitable for the image forming apparatus.

Figure 38:
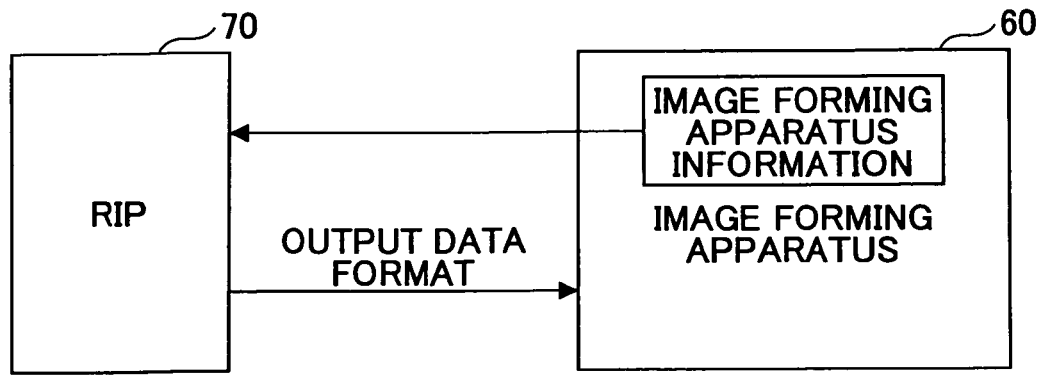
FIG. 38 is a block diagram of an example in which image forming apparatus information is stored in an image forming apparatus.

Image forming apparatus information contains information regarding a scan position of the image forming apparatus and its misalignment, information regarding a number of image recording devices mounted to the image forming apparatus, information regarding a number of scan lines, information regarding a unique code which can identify the image forming apparatus, etc. A scan position information producing unit 72 generates scan position information based on the image forming apparatus information. An output data producing unit 73 generates data of an output data format from the scan position information produced by the scan position information producing unit 72 and the scan position information produced by the raster imaging unit 71. It should be noted that the image forming apparatus information may be previously stored in the RIP 70. Or, the image forming apparatus information may be previously stored in a storage medium such as flexible disk (FD), a recordable compact disc (CD) or a semiconductor memory, and the information may be read from such a storage medium. Or, the image forming apparatus information may be stored in the image forming apparatus 60 as shown in FIG. 38, and sent to the RIP 70 upon a request by the RIP 70. A communication such as an optical communication or a protocol communication according to a information network may be used to send the image forming apparatus information to the RIP 70.

Figure 39:
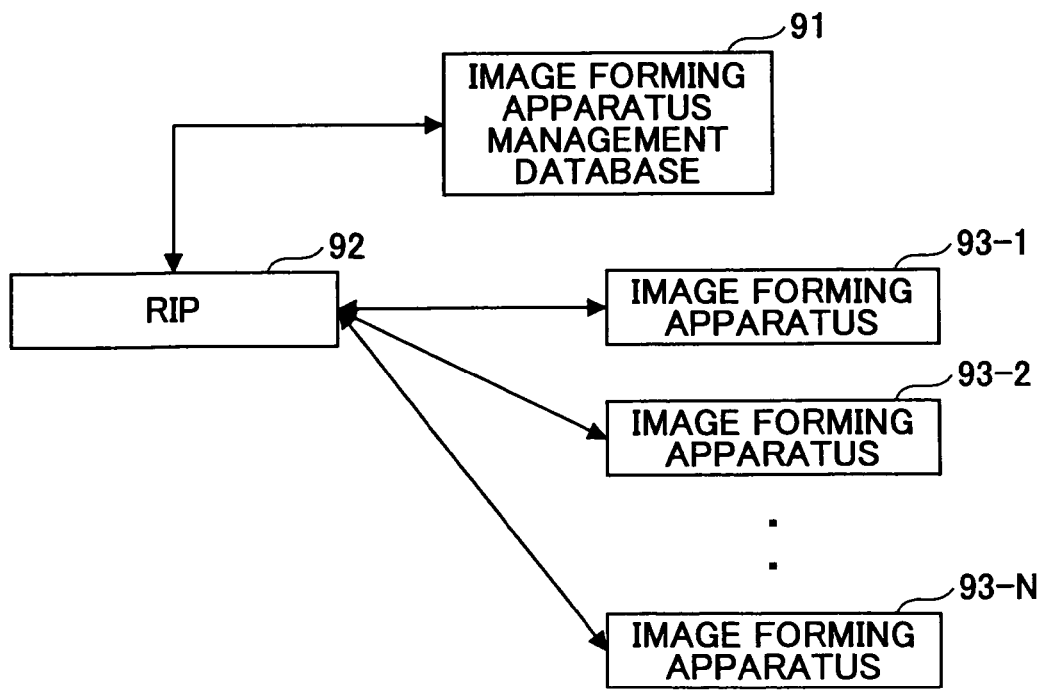
FIG. 39 is a block diagram of a management system of the image forming apparatus information.
Figure 40A:
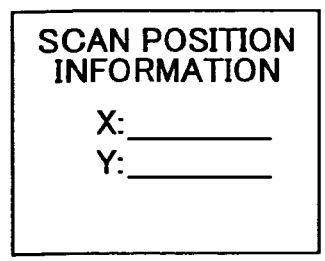
FIGS. 40A and 40B are illustrations showing examples of a display screen which indicates a scan position.
Figure 40B:
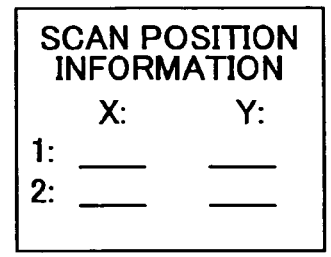

Moreover, the image forming apparatus information may be stored in a third place. For example, as shown in FIG. 39, the image forming apparatus information may be kept by a company or a section which manufacture or manage the image forming apparatuses. The image forming apparatuses and the image forming apparatus information are managed by an image forming apparatus management database 91, and the image forming apparatus information corresponding to each of the image forming apparatuses 93-1 through 93-N can be retrieved upon reference from an external device in accordance with its own identification code. Thus, the RIP 92 sends the above-mentioned unique information, which identifies one of the image forming apparatuses to output, to the image forming apparatus management database 91, and obtains the image forming apparatus information corresponding to the image forming apparatus concerned.

Furthermore, the image processing method according to the present invention may be applied to a printer driver. The printer driver converts image data into data suitable for a printer to output so as to output the converted image data. The printer driver has almost the same function as the RIP. However, the main function of the RIP is to generate raster image data. Thus, software, which can designate setting depending on a printer and mainly relates to a printer output function of an operation system of a computer to operate, is referred to as a printer driver.

A program according to the image processing method of the present invention may be stored in the image forming apparatus. Alternatively, the above-mentioned RIP may be incorporated in the image forming apparatus. The scan position information may be input by displaying a screen showing an input method on a two-dimensional display device, such as a liquid display, mounted in the image forming apparatus, a display of a computer in which the RIP is operated, an input screen of an image forming apparatus management database, etc. For, example, the screen may be that shown in FIGS. 40A and 40B. X and Y on the screens indicate a case of inputting values expressing a two-dimensional coordinates. The screen is not limited to the two-dimensional coordinates, and a screen for inputting values expressing a spatial coordinated such as one-dimensional or more than three-dimensional coordinates or polar coordinates may be used.

Figure 11:
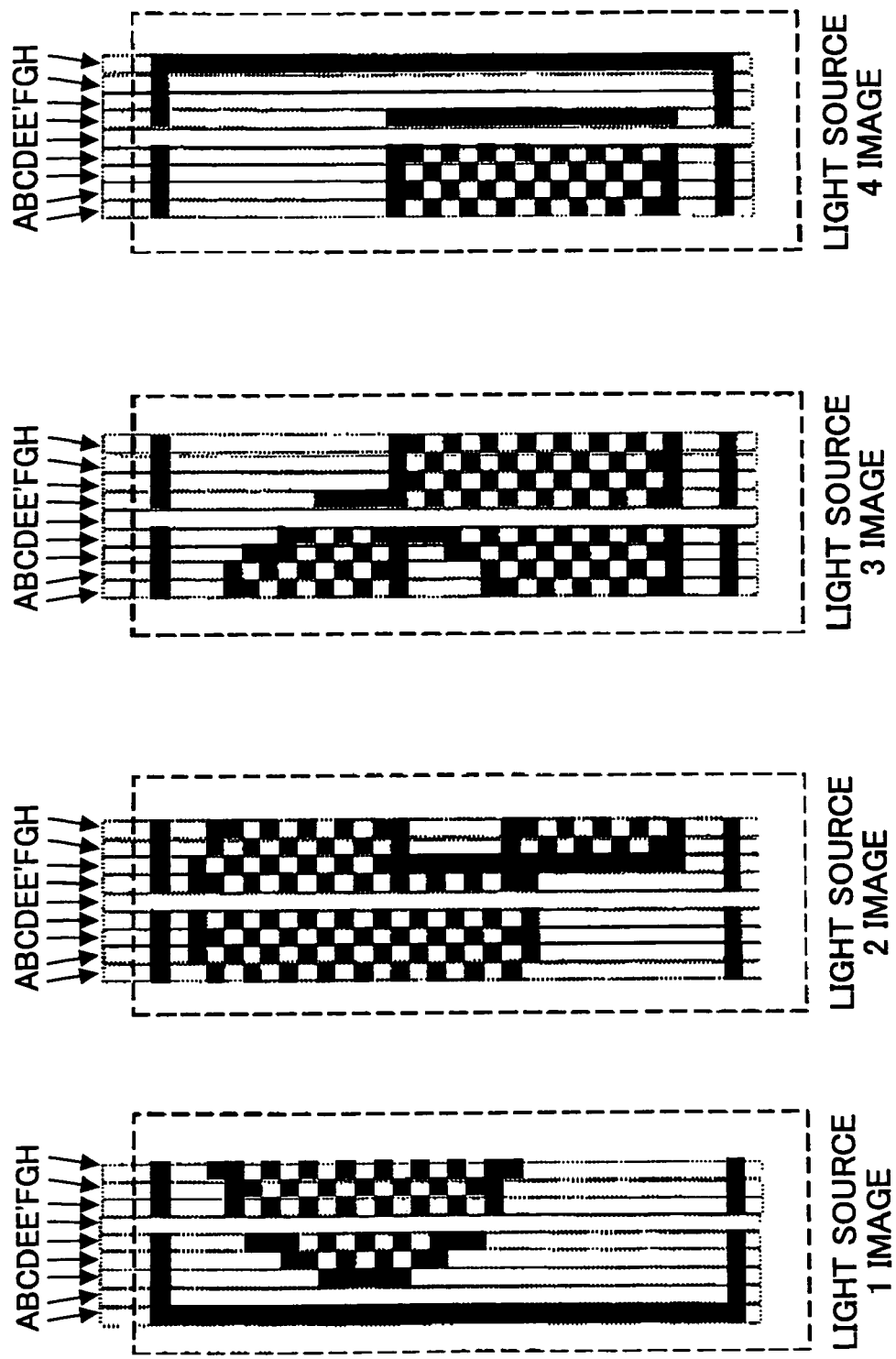
FIG. 11 is an illustration of an example of sharing of mage formation area by light-sources in a case where there is line data which is not a specified value.
Figure 41:
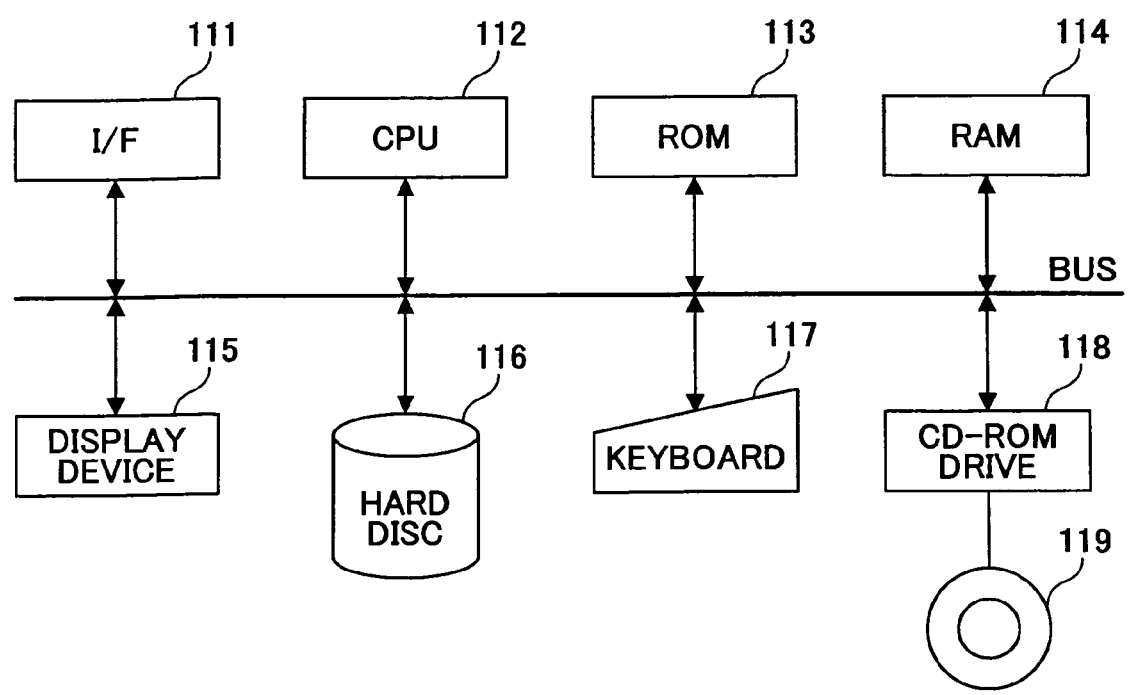
FIG. 41 is a block diagram of an apparatus which executes a program according to the image processing method of the present invention.

FIG. 41 is a block diagram showing a structure of an apparatus which runs a program for executing the image processing method according to an embodiment of the present invention. FIG. 11 shows a hardware of an image processing system including a microprocessor which executes the software according to the image processing method of the embodiment of the present invention.

In FIG. 11, the image processing system comprises an interface (I/F) 111, a CPU 112, a ROM 113, a RAM 114, a display device 115, a hard disk 116, a keyboard 117, and a CD-ROM drive 118. Additionally, a computer readable recording medium 119 such as a CD-ROM stores a program which executes the image processing method according to the present invention. Further, a control signal is input from an external device trough the I/F 111, and the program according to the present invention is started automatically or according to an instruction by an operator through the keyboard 117. The CPU 112 applies a process associated with the above-mentioned image processing method in accordance with the program, and stores the result of the processing in a storage device such as the RAM 114 or the hard disk 116. The stored result is output to the display device 115, etc., if necessary.

As mentioned above, the image processing system can be built by a general-purpose structure without changing the existing system by using a recording medium which stores the program for executing the image processing method according to the present invention.

The present invention is not limited to the specifically disclosed embodiments, and variations and modifications may be made without departing from the scope of the present invention.

The present application is based on Japanese applications No. 2003-077461 filed Mar. 20, 2003, No. 2003-139746 filed May 19, 2003 and No. 2004-123708 filed Apr. 20, 2004, the entire contents of which are hereby incorporated herein by reference.

What is claimed is:

1. An image forming method of an image forming apparatus having a head mounting a plurality of writing units that form an image on a recording medium, the plurality of writing units being aligned in a sub-scanning direction, which corresponds to a direction of scanning by the plurality of writing units perpendicular to a main-scanning direction, which corresponds to a direction of movement of the recording medium, the image forming method comprising:

forming a part of the image on the recording medium by the plurality of writing units, the part of the image forming a line extending in the main-scanning direction;

repeating the step of forming a part of the image while shifting the plurality of writing units in the sub-scanning direction by a predetermined amount of shift; and varying the amount of shift of the plurality of writing units so that an amount of misalignment in a connecting portion between the parts of the image on the recording medium is reduced, wherein a determination of the amount of shift of the plurality of writing units to be varied and the shift of the plurality of writing units by the determined amount of shift are made while said head faces an area where no image is formed.

2. The image forming method as claimed in claim 1, wherein data regarding the amount of misalignment in the connecting portion is obtained from a result of image formation on a recording medium.

3. The image forming method as claimed in claim 1, wherein the plurality of writing units other than at least one of the plurality of writing units, which is to form a part of the image immediately after varying the amount of shift, does not perform image formation while at least one of the plurality of writing units is at a position immediately after varying the amount of shift.

4. The image forming method as claimed in claim 3, wherein the varied amount of shift is returned to said predetermined amount of shift before shifting the plurality of writing units from the position immediately after varying the amount of shift.

5. The image forming method as claimed in claim 1, wherein when a distance between a part of the image formed by a first one of the plurality of writing units at a leading end in the sub-scanning direction and a part of the image formed by a second one of the plurality of writing units at a trailing end in the sub-scanning direction is larger than a width of a single dot, data corresponding to an amount of misalignment of one of the first one and the second one of the plurality of writing units is given to the other one of the first one and the second one of the writing units so as to reduce the amount of misalignment in the connecting portion between the parts of the images formed by the first one and the second one of the plurality of writing units.

6. The image forming method as claimed in claim 1, wherein image formation is started from one of the plurality of writing units having a largest misalignment in the connecting portion of parts of the image between said one of the plurality of writing units and an adjacent one of the plurality of writing units in a direction opposite to a direction of shift of the plurality of writing units.

7. The image forming method as claimed in claim 1, wherein all of plurality of the writing units are caused to start image formation at the same time, and caused to end the image formation sequentially from one of the plurality of writing units having a smallest interval to an adjacent one of the plurality of writing units in a direction of shift of the plurality of writing units.

8. The image forming method as claimed in claim 1, wherein the amount of shift of the plurality of writing units is varied by referring to a data table storing an amount of shift determined according to a pixel density in original image data and data of a head position error generated when mounting the plurality of writing units to said head.

9. The image forming method as claimed in claim 8, wherein said data table is sent to said image forming apparatus before sending data of the image divided into the parts.

10. The image forming method as claimed in claim 8, wherein said data table is stored in one of an image data producing apparatus, which produces data of the image divided into the parts, and the image forming apparatus.

11. The image forming method as claimed in claim 8, wherein each of a plurality of image forming apparatuses is identified, and each of the image forming apparatuses is related to one of a plurality of the data tables in accordance with a result of the identification.

12. The image forming method as claimed in claim 8 wherein the data of a head position error is stored in the image forming apparatus, and said data table is produced by an external image data producing apparatus in accordance with the data of a head position error.

13. The image forming method as claimed in claim 1, wherein when the amount of shift of one of the plurality of writing units corresponding to an arbitrary area of the image is different from the amount of shift of others of the plurality of writing units corresponding to the arbitrary area of the image, a blank part is inserted in the image so that image formation is not performed by the others of the plurality of writing units on the arbitrary area of the image.

14. The image forming method as claimed in claim 13, wherein the amount of shift of plurality of the writing units corresponding to a part of the image proceeding the inserted blank part is corrected.

15. A computer readable recording medium storing a program for causing a computer to perform an image forming method of an image forming apparatus having a head mounting a plurality of writing units that form an image on a recording medium, the writing units being aligned in a sub-scanning direction, which corresponds to a direction of scanning by the plurality of writing units perpendicular to a main-scanning direction, which corresponds to a direction of movement of the recording medium, the image forming method comprising:
- forming a part of the image on the recording medium by the plurality of writing units, the part of the image forming a line extending in the main-scanning direction;
- repeating the step of forming a part of the image while shifting the plurality of writing units in the sub-scanning direction by a predetermined amount of shift; and
- varying the amount of shift of the wiring units so that an amount of misalignment in a connecting portion between the parts of the image on the recording medium is reduced, wherein a determination of the amount of shift of the plurality of writing units to be varied and the shift of the plurality of writing units by the determined amount of shift are made while said head faces an area where no image is formed.

16. An image forming apparatus having a head mounting a plurality of writing units that form an image on a recording medium, the writing units being aligned in a sub-scanning direction, which corresponds to a direction of scanning by the plurality of writing units perpendicular to a main-scanning direction, which corresponds to a direction of movement of the recording medium, the image forming apparatus comprising:
- image forming means for forming a part of the image on the recording medium by the plurality of writing units, the part of the image forming a line extending in the main-scanning direction, the formation of a part of the image being repeated while shifting the plurality of writing units in the sub-scanning direction by a predetermined amount of shift; and
- correcting means for varying the amount of shift of the plurality of wiring units so that an amount of misalignment in a connecting portion between the parts of the image on the recording medium is reduced, wherein a determination of the amount of shift of the plurality of writing units to be varied and the shift of the plurality of writing units by the determined amount of shift are made while said head faces and area where no image is formed.

17. The image forming apparatus as claimed in claim 16, wherein said recording medium includes a printing plate and/or a mask film, and said image forming apparatus further comprising a printing mechanism which performs printing using the recording medium.

18. An image forming apparatus comprising:
- a plurality of writing units mounted on a head that form a single image on a recording medium by writing divided parts of the image on the recording medium in accordance with divided image data obtained by dividing the single image into a plurality of areas;
- an image data producing unit that produces and stores the divided image data, and sends the divided image data to plurality of writing units; and
- a line shift amount varying unit that varies an amount of shift of lines in the divided image data on an individual line basis, wherein a determination of the amount of shift of the plurality of writing units to be varied and the shift of the plurality of writing units by the determined amount of shift are made while said head faces an area where no image is formed.

* * * * *